US012487549B2

(12) United States Patent
Sugiyama et al.

(10) Patent No.: US 12,487,549 B2
(45) Date of Patent: Dec. 2, 2025

(54) SHEET PROCESSING APPARATUS, SHEET PROCESSING METHOD, AND IMAGE FORMING SYSTEM

(71) Applicants: Keisuke Sugiyama, Kanagawa (JP); Masahiro Tamura, Kanagawa (JP); Masanobu Kimata, Kanagawa (JP); Yuusuke Shibasaki, Tokyo (JP); Shinji Asami, Tokyo (JP); Michitaka Suzuki, Kanagawa (JP); Tomomichi Hoshino, Kanagawa (JP); Wataru Takahashi, Tokyo (JP); Kei Sasaki, Tokyo (JP)

(72) Inventors: Keisuke Sugiyama, Kanagawa (JP); Masahiro Tamura, Kanagawa (JP); Masanobu Kimata, Kanagawa (JP); Yuusuke Shibasaki, Tokyo (JP); Shinji Asami, Tokyo (JP); Michitaka Suzuki, Kanagawa (JP); Tomomichi Hoshino, Kanagawa (JP); Wataru Takahashi, Tokyo (JP); Kei Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/755,172

(22) Filed: Jun. 26, 2024

(65) Prior Publication Data

US 2025/0028273 A1 Jan. 23, 2025

(30) Foreign Application Priority Data

Jul. 18, 2023 (JP) ................................ 2023-117051
Apr. 4, 2024 (JP) ................................ 2024-060788

(51) Int. Cl.
*G03G 15/00* (2006.01)
*B31F 5/02* (2006.01)
(Continued)

(52) U.S. Cl.
CPC ......... *G03G 15/6544* (2013.01); *B31F 5/022* (2013.01); *B42C 9/0093* (2013.01);
(Continued)

(58) Field of Classification Search
CPC ..... G03G 2215/00835; G03G 15/6585; G03G 15/6544; B31F 5/022; B42C 9/0093;
(Continued)

(56) References Cited

U.S. PATENT DOCUMENTS

2003/0080487 A1 5/2003 Tamura et al.
2005/0189689 A1 9/2005 Kushida et al.
(Continued)

FOREIGN PATENT DOCUMENTS

EP 3715955 A1 9/2020
JP 2004-168012 A 6/2004
(Continued)

OTHER PUBLICATIONS

European Search Report; Application EP24183352; Oct. 31, 2024.
European Search Report; Application EP24183352; Sep. 11, 2024.

*Primary Examiner* — David H Banh
(74) *Attorney, Agent, or Firm* — Duft & Bornsen, PC

(57) ABSTRACT

A sheet processing apparatus includes: a center-folder to perform a center-folding process on a sheet bundle including multiple sheet materials; a back-crimp binder to: form a back portion on the sheet bundle subjected to the center-folding process; and perform a crimp-binding process on the back portion; and a controller configured to: cause the center-folder to perform the center-folding process; and cause the back-crimp binder to perform the crimp-binding process on the back portion while forming the back portion on the sheet bundle in the crimp-binding process.

14 Claims, 26 Drawing Sheets

(51) Int. Cl.

| | |
|---|---|
| ***B42C 9/00*** | (2006.01) |
| ***B65H 37/04*** | (2006.01) |
| ***B65H 45/18*** | (2006.01) |

(52) U.S. Cl.

CPC ............. *B65H 37/04* (2013.01); *B65H 45/18* (2013.01); *G03G 15/6585* (2013.01); *B65H 2301/45* (2013.01); *B65H 2301/51614* (2013.01); *B65H 2301/51616* (2013.01); *B65H 2404/144* (2013.01); *B65H 2511/224* (2013.01); *B65H 2701/13212* (2013.01); *G03G 2215/00835* (2013.01)

(58) Field of Classification Search

CPC .... B65H 37/04; B65H 45/18; B65H 2301/45; B65H 2301/51614; B65H 2301/51616; B65H 2404/144; B65H 2511/224; B65H 2701/13212

See application file for complete search history.

(56) References Cited

U.S. PATENT DOCUMENTS

| | | | | |
|---|---|---|---|---|
| 2009/0111673 | A1* | 4/2009 | Bober | G03G 15/6544 493/405 |
| 2013/0001848 | A1* | 1/2013 | Hidaka | G03G 15/6544 270/58.27 |
| 2013/0001849 | A1* | 1/2013 | Suzuki | B65H 45/18 270/58.27 |
| 2013/0264762 | A1 | 10/2013 | Matsushita et al. | |
| 2013/0270761 | A1 | 10/2013 | Kimata | |
| 2014/0077436 | A1* | 3/2014 | Hata | B65H 45/12 270/45 |
| 2014/0138896 | A1 | 5/2014 | Yoshida et al. | |
| 2014/0219747 | A1 | 8/2014 | Takahashi et al. | |
| 2015/0003938 | A1 | 1/2015 | Morinaga et al. | |
| 2015/0093214 | A1 | 4/2015 | Takahashi et al. | |
| 2016/0340144 | A1 | 11/2016 | Sakano et al. | |
| 2020/0307945 | A1* | 10/2020 | Mori | G03G 15/6541 |

FOREIGN PATENT DOCUMENTS

| | | | |
|---|---|---|---|
| JP | 2004-209858 | A | 7/2004 |
| JP | 2014-031268 | A | 2/2014 |
| JP | 2014-118300 | A | 6/2014 |
| WO | 2009/110298 | A1 | 9/2009 |

* cited by examiner

SHEET PROCESSING APPARATUS, SHEET PROCESSING METHOD, AND IMAGE FORMING SYSTEM

CROSS-REFERENCE TO RELATED APPLICATIONS

This patent application is based on and claims priority pursuant to 35 U.S.C. § 119(a) to Japanese Patent Application No. 2023-117051, filed on Jul. 18, 2023, in the Japan Patent Office, and Japanese Patent Application No. 2024-060788, filed on Apr. 4, 2024, in the Japan Patent Office the entire disclosure of which is hereby incorporated by reference herein.

BACKGROUND

Technical Field

The present disclosure relates to a sheet processing apparatus, a sheet processing method, and an image forming system.

Related Art

A sheet processing apparatus can execute a "binding process" of binding a sheet bundle in which sheet-like recording media have been put together. Multiple types of binding process as binding processes are executed in the sheet processing apparatus. For example, the binding processes include "edge stitching" and "saddle stitching". The "edge stitching" is for binding an edge of a sheet bundle. The "saddle stitching" is for folding a sheet bundle in two and binding the sheet bundle at a portion in the vicinity of a folding position. The saddle stitching s a binding method mainly used when a book such as a booklet is made.

SUMMARY

According to an aspect of the present disclosure, a sheet processing apparatus includes: a center-folder to perform a center-folding process on a sheet bundle including multiple sheet materials; a back-crimp binder to: form a back portion on the sheet bundle subjected to the center-folding process; and perform a crimp-binding process on the back portion; and a controller configured to: cause the center-folder to perform the center-folding process; and cause the back-crimp binder to perform the crimp-binding process on the back portion while forming the back portion on the sheet bundle in the crimp-binding process.

According to another aspect of the present disclosure, a sheet processing method is provided that includes performing a center-folding process, on a sheet bundle including multiple sheet materials, to from a fold portion in the sheet bundle; forming a back portion on the sheet bundle subjected to the center-folding process; and performing a crimp-binding process on the back portion while forming the back portion on the fold portion of the sheet bundle.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
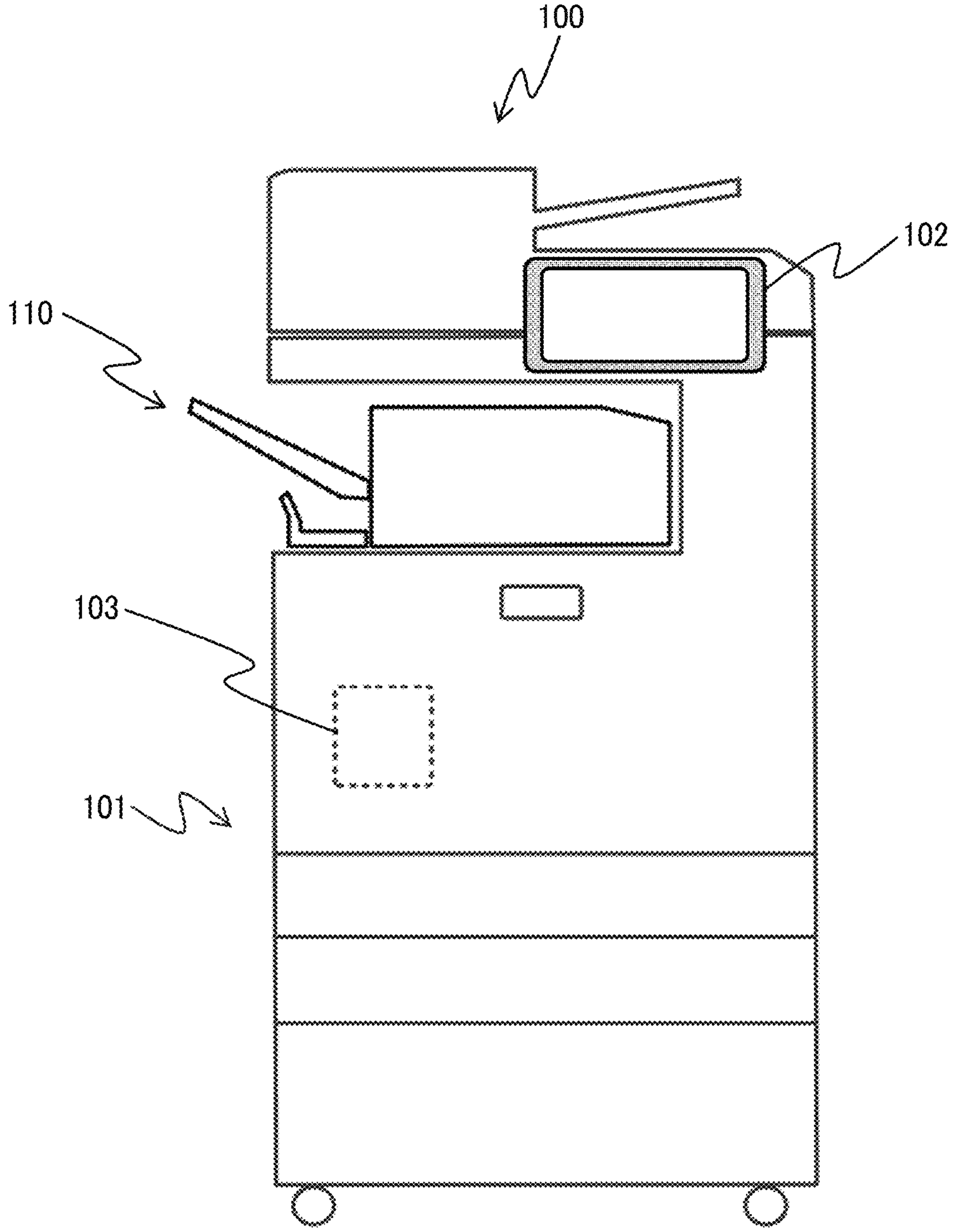
FIG. 1 is a diagram illustrating an overall configuration of an image forming system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Hereinafter, a first embodiment of a sheet processing apparatus, a sheet processing method, and an image forming system according to the present disclosure will be described with reference to the drawings. FIG. 1 is a diagram illustrating an overall configuration of a multifunction printer (MFP) 100 as an embodiment of an image forming system. As illustrated in FIG. 1, the MFP 100 includes an image forming apparatus 101 and a post-processing apparatus 110. The image forming apparatus 101 forms an image on a sheet P corresponding to an example of a sheet material as a sheet-like medium. The post-processing apparatus 110 executes predetermined post-processing on the sheet P on which an image has been formed. The MFP 100 corresponds to an embodiment of an in-body image forming system in which the post-processing apparatus 110 is disposed in an in-body space of the image forming apparatus 101.

The image forming apparatus 101 forms an image on the sheet P, and ejects the sheet P on which the image has been formed to the post-processing apparatus 110. The image forming apparatus 101 includes a tray, a conveyor, and an image former. Sheets P are stored in the tray. The conveyor conveys a sheet P stored in the tray. The image former forms an image on the sheet P conveyed by the conveyor. The image former can execute a known image forming method. For example, the image former may use an inkjet method for discharging liquid ink toward the sheet P and causing the liquid ink to adhere to the sheet P to form an image, or may use an electrophotographic method for forming an image by using toner. The configuration and operation of the image forming apparatus 101 correspond to the configuration and operation known in the art, and thus detailed description thereof will be omitted.

Figure 2:
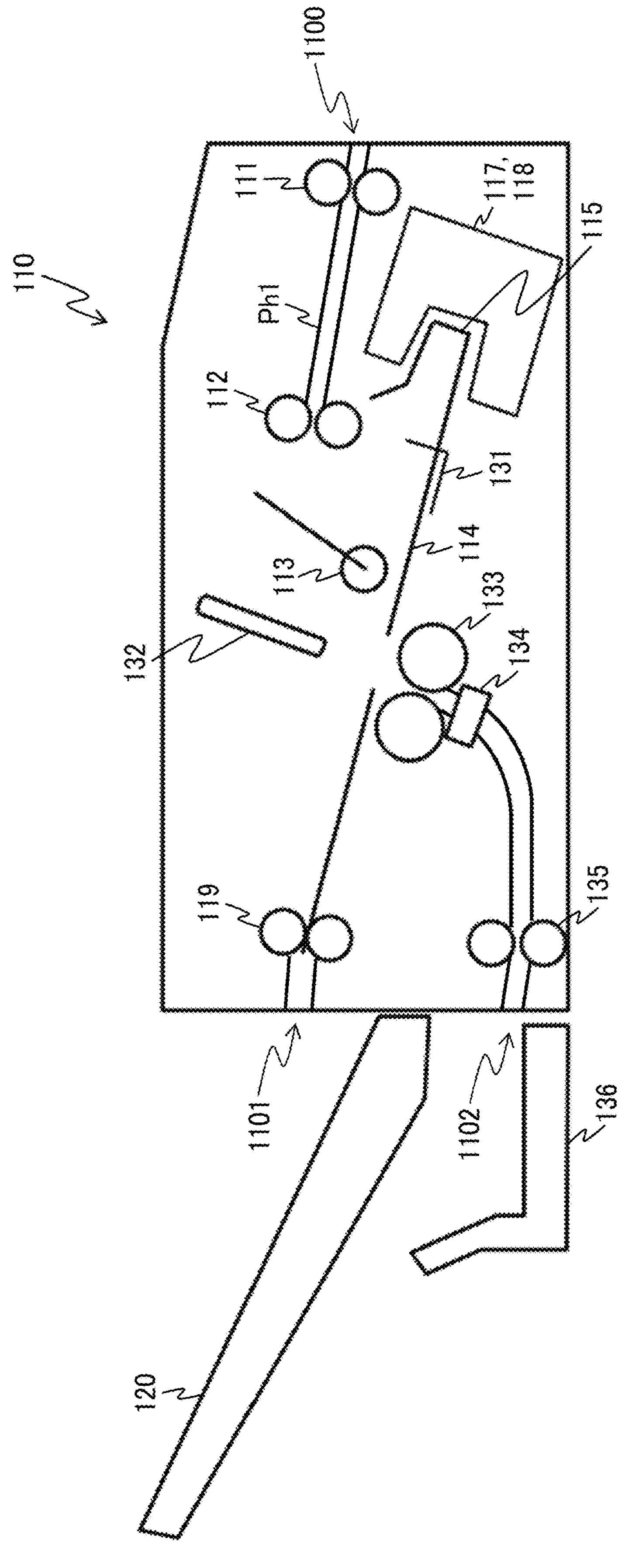
FIG. 2 is a diagram illustrating an internal structure of a post-processing apparatus according to the first embodiment.

Next, a detailed description will be given of the post-processing apparatus 110 as an embodiment of the sheet processing apparatus according to the present disclosure. FIG. 2 is a diagram illustrating an internal structure of the post-processing apparatus 110 according to the first embodiment. The post-processing apparatus 110 has a function of performing post-processing on the sheet P on which an image has been formed by the image forming apparatus 101. The post-processing apparatus 110 performs a binding process of receiving the sheet P on which an image has been formed through a carry-in port 1100, through which the sheet P is received from the image forming apparatus 101, and binding a sheet bundle Pb in which multiple sheets has been put together.

More specifically, the binding according to the present embodiment includes "crimp binding" and "stapling." The crimp binding is a process of pressing and deforming the sheet bundle Pb, which includes multiple stacked sheets P, at a binding position to bind the sheet bundle Pb. The stapling is a process of binding the sheet bundle Pb with a staple at the binding position. The crimp binding includes edge stitching and saddle stitching. The edge stitching is a process to bind an edge of the sheet bundle Pb. The saddle stitching is a process to bind the center of the sheet bundle Pb.

The post-processing apparatus 110 includes a first conveyance roller pair 111 and a second conveyance roller pair 112 for conveying the sheet P carried in through the carry-in port 1100 along a conveyance path. The first conveyance roller pair 111 and the second conveyance roller pair 112 convey the sheet P fed from the image forming apparatus 101 along a first conveyance path Ph1 inside the post-processing apparatus 110.

The first conveyance path Ph1 is a path extending from the carry-in port 1100, through which the sheet P is carried in from the image forming apparatus 101, to an inner tray 114.

Edge Stitching

The post-processing apparatus 110 includes a return conveyance roller 113, the inner tray 114, an end fence 115, side fences 116, a staple-edge-binding processing unit 117, a crimp-edge-binding processing unit 118, an ejection roller pair 119, and an ejection tray 120. The staple-edge-binding processing unit 117 and the crimp-edge-binding processing unit 118 serve as edge-stitching units.

The return conveyance roller 113 serves as a conveyance roller for placing, on the inner tray 114, the sheet P having passed through the second conveyance roller pair 112, and conveying the sheet P on the inner tray 114 toward the end fence 115. A direction of conveyance by the return conveyance roller 113 is different from a direction of conveyance by the first conveyance roller pair 111 and the second conveyance roller pair 112, and corresponds to a direction (reverse direction) in which the sheet P conveyed by the first conveyance roller pair 111 and the second conveyance roller pair 112 is turned around. Therefore, the conveyance by the return conveyance roller 113 is referred to as switchback conveyance.

The sheet P as a sheet material is conveyed to the inner tray 114 by the first conveyance roller pair 111, the second conveyance roller pair 112, and the return conveyance roller 113, and is subjected to a binding process. The first conveyance roller pair 111, the second conveyance roller pair 112, the return conveyance roller 113, and the first conveyance path Ph1 form a conveyance means that conveys the sheet P to the inner tray 114 serving as a stacking means.

The inner tray 114 corresponds to a stacking means on which multiple sheets P sequentially conveyed is temporarily placed. The sheets P placed on the inner tray 114 are switchback-conveyed by the return conveyance roller 113 to a position where the sheets P collide with the end fence 115. The end fence 115 serves as an alignment member for aligning edges of the sheets P in the direction of the switchback conveyance. Edges of the multiple sheets P stacked on the inner tray 114 are aligned by the end fence 115 to form the sheet bundle Pb.

A pair of the side fences 116 is disposed in a width direction of the inner tray 114 (width direction of the sheets P). In other words, the pair of side fences 116 is disposed at both side ends of the inner tray 114 in a direction orthogonal to the direction in which the sheets P are switchback-conveyed, that is, the direction in which the sheets P are conveyed to the end fence 115.

The side fences 116 perform "jogger operation" in which the side fences 116 repeat coming into contact with and separating from the width-directional edges of the multiple sheets P stacked on the inner tray 114. By this jogger operation, the width-directional edges of the multiple sheets P are also aligned. That is, the side fences 116 serve as an alignment member for aligning both width-directional edges (both edges in the direction orthogonal to the conveyance direction) of the sheets P placed on the inner tray 114.

The staple-edge-binding processing unit 117 and the crimp-edge-binding processing unit 118 serving as edge-stitching units perform a binding process on an edge of the sheet bundle Pb aligned by the end fence 115 and the side fences 116.

After the binding process is performed, the return conveyance roller 113 rotates in contact with the sheet bundle Pb placed on the inner tray 114. A direction of the rotation performed at this time is opposite to a direction of rotation performed during switchback conveyance. Therefore, the sheet bundle Pb subjected to edge stitching is ejected from a first ejection port 1101 toward the ejection tray 120 by the return conveyance roller 113.

The "edge stitching" to be performed on the sheet bundle Pb by the staple-edge-binding processing unit 117 and the crimp-edge-binding processing unit 118 includes multiple types of processes. For example, the "edge stitching" includes a "parallel-binding process," an "oblique-binding process," and a "two-location-binding process." In the "parallel-binding process," binding is performed along one side parallel to a main scanning direction of the sheet bundle Pb. In the "oblique-binding process," binding is performed at a corner of the sheet bundle Pb. In the "two-location-binding process," binding is performed at multiple locations separated in the width direction along one side parallel to the conveyance direction of the sheet bundle Pb.

Figure 3:
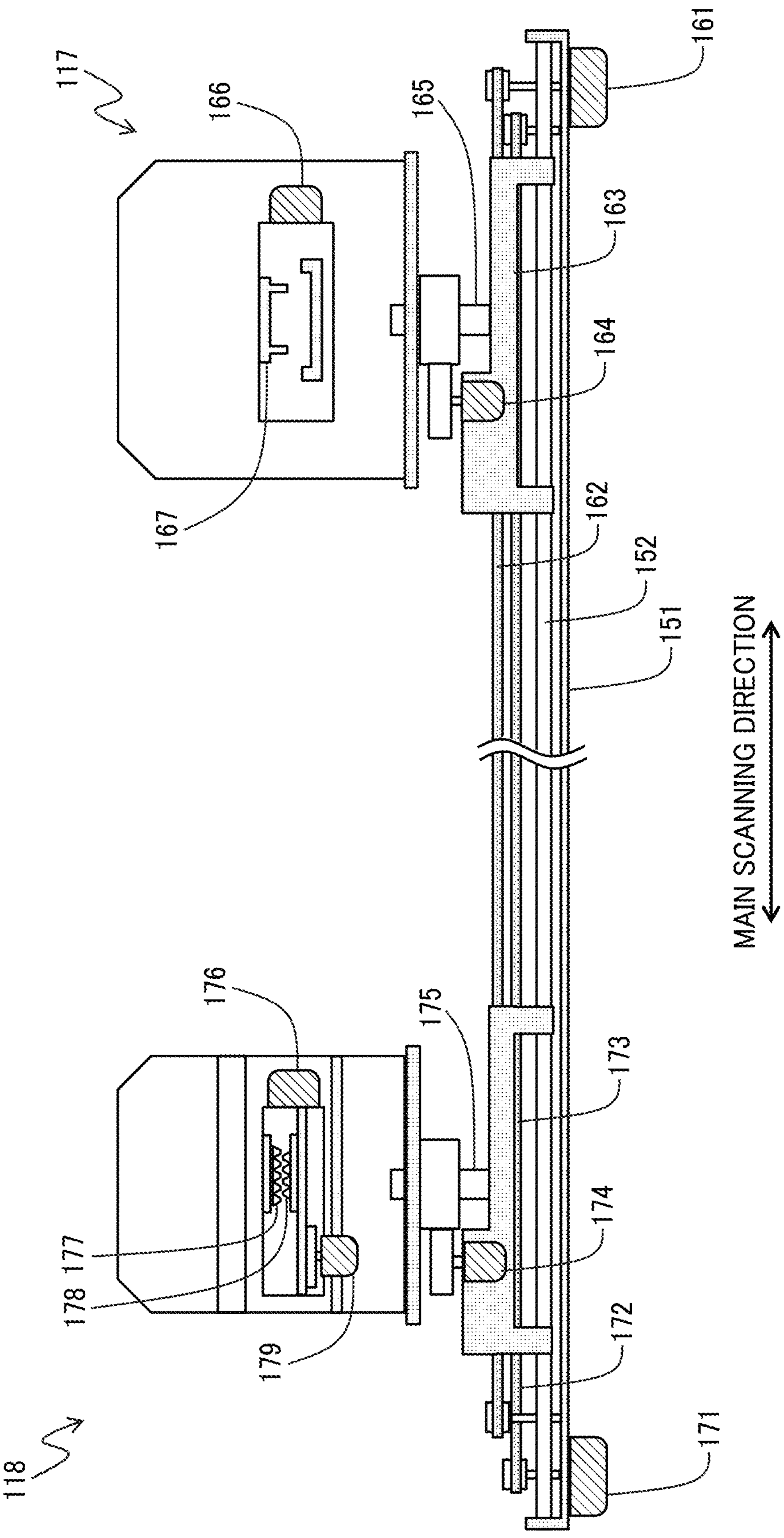
FIG. 3 is a schematic diagram illustrating an edge-stitching unit viewed from an ejection port side.

FIG. 3 is a schematic diagram illustrating an edge-stitching unit 1110 including the staple-edge-binding processing unit 117 and the crimp-edge-binding processing unit 118, as viewed in a direction from the first ejection port 1101 toward the end fence 115. As illustrated in FIG. 3, the edge-stitching unit 1110 is attached to an edge-stitching unit base member 151 in a state where the staple-edge-binding processing unit 117 and the crimp-edge-binding processing unit 118 are separated from each other in the main scanning direction. The edge-stitching unit 1110 is supported by a guide shaft 152 extending in the main scanning direction, via the edge-stitching unit base member 151. Therefore, both the staple-edge-binding processing unit 117 and the crimp-edge-binding processing unit 118 are supported in such a way as to be movable along the guide shaft 152.

The staple-edge-binding processing unit 117 includes a staple-edge-binding main scanning motor 161, a driving force transmission mechanism 162, and a staple-edge-binding processing unit base member 163. The staple-edge-binding processing unit 117 is movable in the main scanning direction along the guide shaft 152 by the driving force of the staple-edge-binding main scanning motor 161.

The staple-edge-binding main scanning motor 161 generates a driving force for moving the staple-edge-binding processing unit 117. The driving force transmission mechanism 162 transmits the driving force of the staple-edge-binding main scanning motor 161 to the staple-edge-binding processing unit base member 163 via a pulley and a timing belt. Accordingly, the staple-edge-binding processing unit 117 is movable in the main scanning direction along the guide shaft 152.

The staple-edge-binding processing unit 117 further includes a staple-edge-binding posture rotation motor 164, and rotates about a stapling rotation shaft 165 as a rotation center with respect to the staple-edge-binding processing unit base member 163.

In addition, the staple-edge-binding processing unit 117 includes a staple-edge-binding clinch motor 166, and causes a staple clincher 167 to perform opening/closing operation. Thus, a staple penetrates the sheet bundle Pb, and is clinched to execute stapling.

The crimp-edge-binding processing unit 118 includes a crimp-edge-binding main scanning motor 171, a driving force transmission mechanism 172, and a crimp-edge-binding processing unit base member 173. The crimp-edge-binding processing unit 118 is movable in the main scanning direction along the guide shaft 152 by the driving force of the crimp-edge-binding main scanning motor 171.

The crimp-edge-binding main scanning motor 171 generates a driving force for moving the crimp-edge-binding processing unit 118. The driving force transmission mechanism 172 transmits the driving force of the crimp-edge-binding main scanning motor 171 to the crimp-edge-binding processing unit base member 173 via a pulley and a timing belt. As a result, the crimp-edge-binding processing unit 118 becomes movable in the main scanning direction along the guide shaft 152.

Furthermore, the crimp-edge-binding processing unit 118 includes a crimp-edge-binding posture rotation motor 174, and rotates about a crimp-binding rotation shaft 175 as a rotation center with respect to the crimp-edge-binding processing unit base member 173.

In addition, the crimp-edge-binding processing unit 118 includes a crimp-edge-binding clinch motor 176, and causes "opening/closing operation" to be performed by the driving force of the crimp-edge-binding clinch motor 176. In the opening/closing operation, upper crimping teeth 177 approach or separate from lower crimping teeth 178. With this opening/closing operation, it is possible to nip the edge of the sheet bundle Pb between the upper crimping teeth 177 and the lower crimping teeth 178 having a protruding-recessed shape and to press and deform the sheet bundle Pb. Due to this pressure deformation, fibers of the sheets P included in the sheet bundle Pb are entangled with each other to form the sheet bundle Pb of the multiple sheets P. As described above, binding based on pressure deformation is referred to as "crimp binding."

Figure 4A:
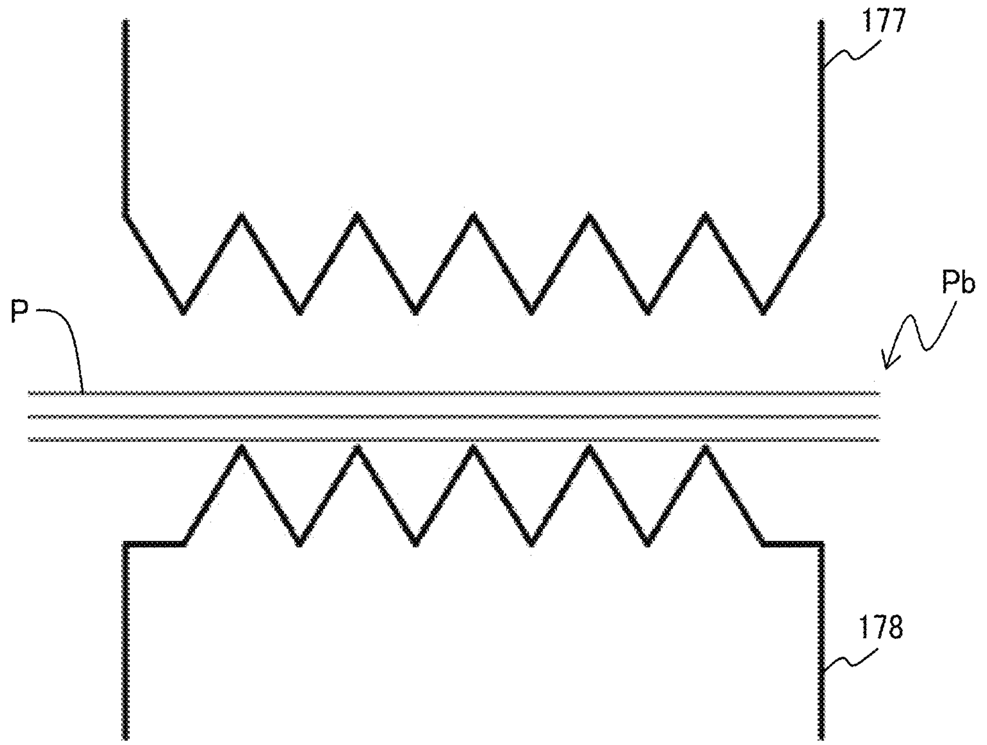
FIGS. 4A and 4B are schematic diagrams illustrating configurations of crimping teeth of a crimp-edge-binding processing unit.
Figure 4B:
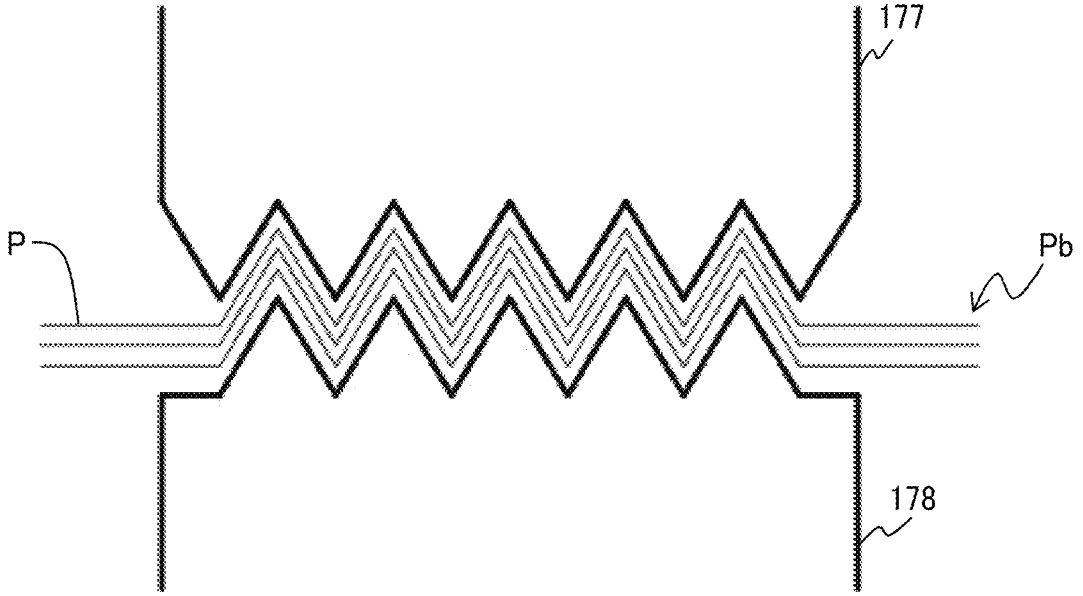

FIGS. 4A and 4B are schematic diagrams illustrating configurations of the upper crimping teeth 177 and the lower crimping teeth 178 each serving as a crimping portion included in the crimp-edge-binding processing unit 118. As illustrated in FIGS. 4A and 4B, the crimping portion includes a pair of upper crimping teeth 177 and lower crimping teeth 178. The upper crimping teeth 177 and the lower crimping teeth 178 are arranged in such a way as to face each other in a thickness direction of the sheet bundle Pb such that the sheet bundle Pb placed on the inner tray 114 can be sandwiched between the upper crimping teeth 177 and the lower crimping teeth 178. The upper crimping teeth 177 and the lower crimping teeth 178 are formed in a protruding-recessed shape in which recesses and protrusions are alternately formed. In addition, the upper crimping teeth 177 and the lower crimping teeth 178 are formed such that the recesses and protrusions are displaced so that the upper crimping teeth 177 and the lower crimping teeth 178 can engage with each other. The crimping portion is configured such that the upper crimping teeth 177 opens and closes with respect to (comes into contact with and separates from) the lower crimping teeth 178 by the driving force of the crimp-edge-binding clinch motor 176.

In the process of feeding the multiple sheets P to be included in the sheet bundle Pb to the inner tray 114, the upper crimping teeth 177 and the lower crimping teeth 178 are separated from each other as illustrated in FIG. 4A. Then, when all the sheets P to be included in the sheet bundle Pb are placed on the inner tray 114 and predetermined alignment operation (operation of aligning the edges) is completed, the crimp-edge-binding processing unit 118 moves to a binding position, and the upper crimping teeth 177 and the lower crimping teeth 178 approach and engage with each other as illustrated in FIG. 4B. That is, the upper crimping teeth 177 and the lower crimping teeth 178 nip the sheet bundle Pb at a predetermined binding portion thereof to press and deform the sheet bundle Pb from the thickness direction. As a result, the sheet bundle Pb placed on the inner tray 114 is crimped and bound. Then, the sheet bundle Pb having been crimped and bound is ejected from the first ejection port 1101 toward the ejection tray 120 by the ejection roller pair 119.

The crimp-edge-binding processing unit 118 just needs to exert a function of pressurizing the sheet bundle Pb to crimp a specific portion. Therefore, the upper crimping teeth 177 and the lower crimping teeth 178 just need to be configured such that the upper crimping teeth 177 and the lower crimping teeth 178 can engage with each other to pressurize the sheet bundle Pb when the sheet bundle Pb is sandwiched between the upper crimping teeth 177 and the lower crimping teeth 178 to be bound. Therefore, a configuration that allows execution of the operation of closing the upper crimping teeth 177 and the lower crimping teeth 178 is not limited to the exemplary configuration disclosed in the present embodiment. For example, a link mechanism-type crimping mechanism may be used (for example, disclosed in Japanese Patent No. 6057167) which performs operation of causing the upper crimping teeth 177 and the lower crimping teeth 178 to approach (crimp) and separate from each other, by means of a drive source and a link mechanism that perform only forward rotation or forward and reverse rotation. In addition, a linear motion-type crimping mechanism may be used which causes the upper crimping teeth 177 and the lower crimping teeth 178 to linearly perform crimping and separating operation, by means of a screw mechanism that converts rotational motion of a drive source into linear motion.

In addition, as illustrated in FIG. 3, the crimping portion includes a binding-tooth slide mechanism for moving the upper crimping teeth 177 and the lower crimping teeth 178 relative to a frame of the crimp-edge-binding processing unit 118. The binding-tooth slide mechanism includes a binding-teeth slide motor 179 and a drive transmission mechanism. The drive transmission mechanism serves as a linear-motion conversion mechanism, such as a rack-and-pinion mechanism or a crankshaft mechanism, which transmits the driving force of the binding-teeth slide motor 179. When the driving force from the binding-teeth slide motor 179 is transmitted to the upper crimping teeth 177 and the lower crimping teeth 178 by the drive transmission mechanism, the upper crimping teeth 177 and the lower crimping teeth 178 slide along respective longitudinal directions (longitudinal direction of the edge-stitching unit base member 151).

Here, the amount of slide movement of the upper crimping teeth 177 and the lower crimping teeth 178 is equivalent to, for example, a crimp mark length. Then, the upper crimping teeth 177 and the lower crimping teeth 178 perform crimp-binding operation multiple times before and after the slide movement. That is, when the length of each crimp mark to be made by the upper crimping teeth 177 and the lower crimping teeth 178 is 10 mm, the amount of slide movement is also set to 10 mm. Thus, it is possible to obtain a crimp mark having a length of 20 mm in total by crimping operation (first stroke) before the slide movement and crimping operation (second stroke) after the slide movement. As a result, the binding force is improved about twofold.

Figure 5A:
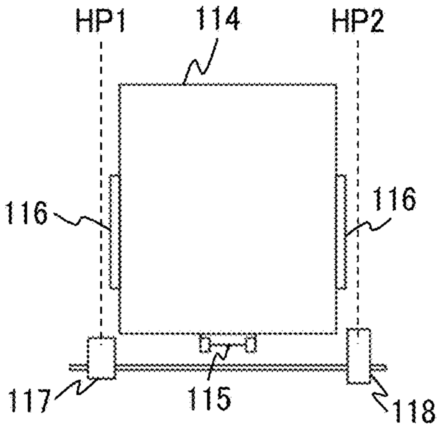
FIGS. 5A to 5E are diagrams illustrating movement positions of the edge-stitching unit.

Outline of Binding Process FIGS. 5A to 5E are diagrams illustrating positions of the staple-edge-binding processing unit 117 and the crimp-edge-binding processing unit 118 according to steps in the binding process. FIG. 5A illustrates a standby state for the binding process. As illustrated in FIG. 5A, in the standby state, the staple-edge-binding processing unit 117 is located at a stapling standby position HP1. The crimp-edge-binding processing unit 118 is located at a crimp-binding standby position HP2.

Figure 5B:
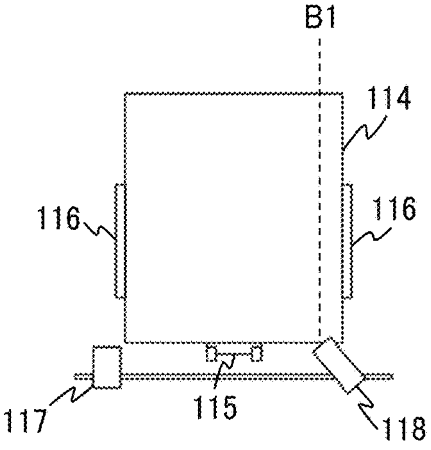
Figure 5C:
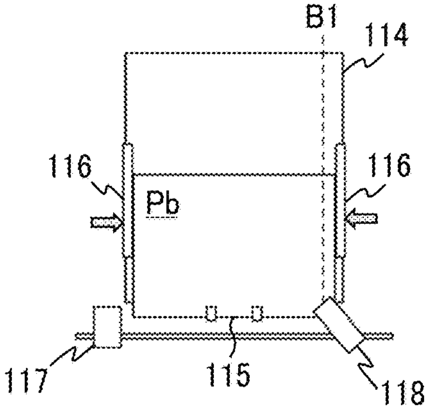

FIGS. 5B and 5C illustrate a state in which an oblique-binding process is performed by the crimp-edge-binding processing unit 118. As illustrated in FIGS. 5B, before a first sheet P1 to be included in the sheet bundle Pb is fed to the inner tray 114, the crimp-edge-binding processing unit 118 is moved in the main scanning direction and obliquely rotated so that the crimp-edge-binding processing unit 118 can face a first binding position B1. The movement and rotation of the crimp-edge-binding processing unit 118 are controlled by a controller 190 serving as a controller to be described below with reference to FIG. 10.

Subsequently, as illustrated in FIG. 5C, the controller 190 causes jogging operation to be executed each time the sheet P is conveyed to the inner tray 114, in a state where the crimp-edge-binding processing unit 118 has been disposed at a position where the crimp-edge-binding processing unit 118 faces the first binding position B1. The jogging operation is executed by the controller 190 performing control in such a way as to cause the side fences 116 to slide in the width direction.

Subsequently, in the state illustrated in FIG. 5C, the controller 190 repeats stacking and alignment operation of the sheets P until the number of sheets P to be included in the sheet bundle Pb reaches a predetermined number N.

Next, when detecting that the number of sheets P placed on the inner tray 114 has reached the predetermined number N, the controller 190 causes the crimp-edge-binding processing unit 118 to operate so as to perform crimp-binding operation at the first binding position B1 of the sheet bundle Pb placed on the inner tray 114.

Next, the controller 190 ejects, to the ejection tray 120, the sheet bundle Pb subjected to the crimp binding at the first binding position B1. Furthermore, the controller 190 moves the crimp-edge-binding processing unit 118 to the crimp-binding standby position HP2 illustrated in FIG. 5A.

Figure 5D:
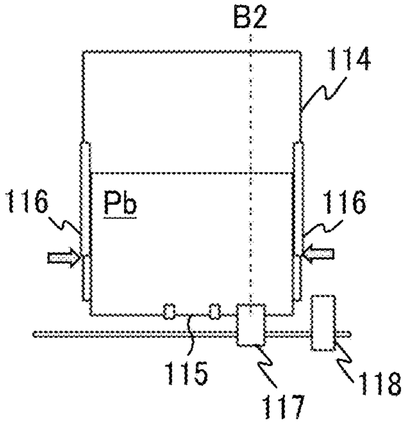
Figure 5E:
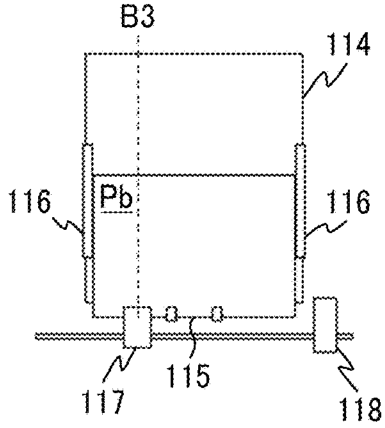

FIGS. 5D and 5E illustrate a state in which a two-location-binding process is performed by the staple-edge-binding processing unit 117. A second binding position B2 and a third binding position B3 are separated from each other in the main scanning direction. Before the first sheet P1 to be included in the sheet bundle Pb is fed to the inner tray 114, the controller 190 moves the staple-edge-binding processing unit 117 in the main scanning direction so that the staple-edge-binding processing unit 117 can face the second binding position B2. Next, as illustrated in FIG. 5D, the controller 190 causes the side fences 116 to execute jogging operation in a state where the staple-edge-binding processing unit 117 has been moved to a position where the staple-edge-binding processing unit 117 can face the second binding position B2.

Subsequently, in the state illustrated in FIG. 5D, the controller 190 repeats stacking and alignment operation of the sheets P until the number of sheets P to be included in the sheet bundle Pb reaches the predetermined number N.

Next, when detecting that the number of sheets P placed on the inner tray 114 has reached the predetermined number N, the controller 190 causes the staple-edge-binding processing unit 117 to operate so as to perform stapling operation at the first binding position B1 of the sheet bundle Pb placed on the inner tray 114.

Next, as illustrated in FIG. 5E, the controller 190 causes the staple-edge-binding processing unit 117 to face the third binding position B3 and perform stapling operation at the third binding position B3 of the sheet bundle Pb placed on the inner tray 114.

In the examples of FIGS. 5A to 5E, after binding is performed at the second binding position B2 in the two-location binding, binding is performed at the third binding position B3. However, the order of execution of the two-location binding is not limited thereto. That is, the two-location binding may be executed such that the second binding position B2 is bound after the third binding position B3 is bound. In a case where the number of multiple sheet bundles to be bound is continuous, for example, the third binding position B3 is bound after the second binding position B2 is bound for an odd-numbered sheet bundle, and the second binding position B2 is bound after the third binding position B3 is bound for an even-numbered sheet bundle. When the binding process is thus performed by rearrangement of the order of binding positions according to the order in the entire multiple sheet bundles to be bound, efficiency of the binding process can be improved.

The controller causes the roller to move forward in the main scanning direction for an odd-numbered sheet bundle; and causes the roller to move backward in the main scanning direction for an even-numbered sheet bundle, to form multiple sheet bundles including the sheet bundle.

Next, the controller 190 ejects, to the ejection tray 120, the sheet bundle Pb stapled at the second binding position B2 and the third binding position B3. In addition, the controller 190 moves the staple-edge-binding processing unit 117 to the stapling standby position HP1 as illustrated in FIG. 5A.

The example of oblique binding of a corner of the sheet bundle Pb or two-location binding of two portions of the sheet bundle Pb has been described in the above embodiment. However, the present disclosure is also applicable to a case of binding three or more portions of the sheet bundle Pb separated in the main scanning direction.

Outline of Crimp-Saddle-Stitching Processing Unit

Here, referring back to FIG. 2, a detailed description will be given of a portion that performs a crimp-saddle-stitching process in the configuration of the post-processing apparatus 110. As illustrated in FIG. 2, the post-processing apparatus 110 includes a movable end fence 131, a folding blade 132, a folding roller pair 133, a folding-blade engagement roller 134, a center-folded booklet ejection roller pair 135, and a center-folded booklet ejection tray 136 in addition to the return conveyance roller 113, the inner tray 114, and the side fences 116.

The movable end fence 131, the folding blade 132, and the folding roller pair 133 form a center-folder. Furthermore, the folding blade 132, the folding roller pair 133, and the folding-blade engagement roller 134 form a crimp-saddle-stitching means.

The movable end fence 131 is a mechanism that moves edges of the sheets P placed on the inner tray 114 in the conveyance direction and aligns a center-folding position with the position of the folding blade 132. The center-folding position is set in the vicinity of the center of the sheets P in the conveyance direction.

After the predetermined number N of sheets P to be included in the sheet bundle Pb are stacked on the inner tray 114 and the alignment process is completed, the movable end fence 131 moves to adjust the center-folding position of the sheet bundle Pb such that the center-folding position faces the folding blade 132. Alternatively, at the stage of placing the predetermined number N of sheets P to be included in the sheet bundle Pb, the position of the movable fence may be moved such that the center-folding position of the sheet bundle Pb faces the folding blade 132, and then the sheets P may be placed on the inner tray 114. In either case, adjustment is made such that the center-folding position on the sheet bundle Pb is set to a position where the sheet bundle Pb is pushed into the folding roller pair 133 by the folding blade 132. Then, in a state where these adjustments have been made, the crimp-saddle-stitching process is executed by operation of the folding blade 132, the folding roller pair 133, and the folding-blade engagement roller 134.

More specifically, the return conveyance roller 113 switchback-conveys the sheet P toward the movable end fence 131 at a timing when the sheet P conveyed from the image forming apparatus 101 is placed on the inner tray 114 after passing through the second conveyance roller pair 112. A series of steps leading to the switchback conveyance corresponds to a conveyance step. At this time, the movable end fence 131 may have already moved to a position corresponding to the center-folding position, or may be at the same position as the end fence 115.

Multiple sheets P sequentially conveyed is temporarily placed on the inner tray 114. The movable end fence 131 is provided for the inner tray 114 such that the movable end fence 131 can move away from the end fence 115 in the conveyance direction. The movable end fence 131 is a member movable in the conveyance direction of the sheets P along the inner tray 114. The movable end fence 131 corresponds to a constituent element that is moved under the control of the controller 190 according to the conveyance direction length of the sheets P placed on the inner tray 114 (synonymous with the conveyance direction length in the switchback conveyance) to change the positions of the sheets P. The position of the movable end fence 131 is set such that a center position in the conveyance direction length of the sheets P faces the folding blade 132.

The side fences 116 align the sheets P or the sheet bundle Pb placed on the inner tray 114 in the main scanning direction (width direction). A crimp-saddle-stitching processing unit performs the crimp-saddle-stitching process on the sheet bundle Pb aligned by the movable end fence 131 and the side fences 116. The sheet bundle Pb subjected to the crimp-saddle-stitching process is ejected by the center-folded booklet ejection roller pair 135, and is placed on the center-folded booklet ejection tray 136 via a second ejection port 1103.

Figure 6A:
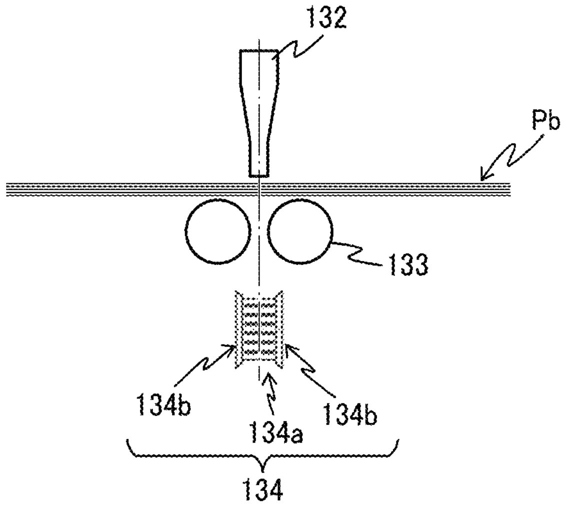
FIGS. 6A to 6E are schematic diagrams illustrating operation of a saddle-stitching unit.

Operation of Crimp-saddle-stitching Means Next, operation of the crimp-saddle-stitching means will be described with reference to FIGS. 6A to 6E. FIGS. 6A to 6E are schematic diagrams mainly illustrating the folding blade 132 as a folding plate, the folding roller pair 133 as a folding-roller pair, and the folding-blade engagement roller 134 as a folding-plate engagement member, which form the crimp-saddle-stitching means. FIGS. 6A to 6E illustrate an outline of center-folding binding to be executed by operation of these members. FIG. 6A illustrates a state in which after the conveyance step and a stacking step, the sheet bundle Pb is placed on the inner tray 114 and the edges of the sheets P are aligned, so that all the sheets P are aligned. In FIG. 6A, the folding blade 132, the folding roller pair 133, and the folding-blade engagement roller 134 are located at initial positions.

At the initial position, the folding blade 132 is substantially perpendicular to the sheet bundle Pb, and is separated from a surface of the sheet bundle Pb. At the initial position, the folding blade 132 faces a folding position at which the sheet bundle Pb is center-folded, and advances and retreats in the thickness direction of the sheet bundle Pb by a folding-blade movement motor 141 (FIG. 10) included in a folding-plate moving mechanism. The folding blade 132 advances and retreats with respect to the sheet bundle Pb between a pushing position and a retracted position in a center-folding step of folding a central portion of the conveyance direction length as a part of the sheet bundle Pb. A fold portion is formed at the pushing position. The folding blade 132 is removed from the sheet bundle Pb at the retracted position after the center of the sheet bundle Pb is folded. The retracted position of the folding blade 132 corresponds to an initial position (HP position).

The folding roller pair 133 is disposed symmetrically with respect to a center line of the folding blade 132. That is, the folding roller pair 133 is disposed symmetrically with respect to the center line along a direction in which the folding blade 132 moves when performing a center-folding action on the sheets P. The folding roller pair 133 is rotated by a folding-roller-pair rotation motor 142 (see FIG. 10). In addition, the folding roller pair 133 has a configuration that allows the folding roller pair 133 to approach and separate from each other by a folding-roller-pair movement motor 143 (see FIG. 10) included in a pressure mechanism.

The distance between a pair of rollers included in the folding roller pair 133 is adjusted under the control of the controller 190. When the sheet bundle Pb is pushed toward the nip position of the folding roller pair 133 by the folding blade 132, the pair of rollers of the folding roller pair 133 is set to a "receiving position" under the control of the controller 190. At the receiving position, the nip position is separated according to a separation amount that is a predetermined amount. Note that before the center-folding process is started, the controller 190 may set the position of the folding roller pair 133 to a position where the folding roller pair 133 is separated from each other further than in the receiving position. The "receiving position" where the sheet bundle Pb is received is also regarded as a position where the folding roller pair 133 is located during standby in the center-folding binding. Thus, the receiving position also corresponds to a standby position.

The folding-blade engagement roller 134 included in a back-crimp binder is a cylindrical roller-shaped member. A rotation axis of the folding-blade engagement roller 134 is set in a direction passing through both ends sandwiching a cylindrical outer peripheral portion. The folding-blade engagement roller 134 is pivotally supported such that the folding-blade engagement roller 134 can rotate about the rotation axis as a rotation center. The folding-blade engagement roller 134 includes an engaging-crimping teeth portion **134*a* having a protruding-recessed shape on the cylindrical outer peripheral portion (cylindrical outer peripheral surface). The folding-blade engagement roller 134 also includes flange portions 134*b* at both ends of the cylindrical outer peripheral surface. Each flange portion 134*b* has an outer diameter larger than the outer diameter of the engaging-crimping teeth portion 134*a*. The flange portions 134*b*** are equal in diameter at both ends of the cylindrical outer peripheral surface.

The engaging-crimping teeth portion **134*a* included in the folding-blade engagement roller 134 is a gear-shaped portion in which protrusions and recesses are repeatedly formed at predetermined intervals on the cylindrical outer peripheral surface of the folding-blade engagement roller 134 like a gear. The protrusions and recesses are formed in parallel with the rotation axis of the folding-blade engagement roller 134**.

First, the center-folding step is executed in the crimp-saddle-stitching process according to the present embodiment. In the center-folding step, first, the controller 190 adjusts positions of the pair of rollers included in the folding roller pair 133 by means of the folding-roller-pair movement motor 143 to bring the sheet bundle Pb into a state where the sheet bundle Pb can be received. The folding-roller-pair movement motor 143 adjusts a gap at the nip position of the folding roller pair 133. The adjustment amount (separation amount) at this time is for forming a gap to such an extent that the folding blade 132 pushes an area in the vicinity of the conveyance direction (length direction) center of the sheet bundle Pb to the nip position (gap) of the folding roller pair 133 and that the folding blade 132 can advance in the nip position while pushing the sheet bundle Pb. Therefore, the adjustment amount of the gap at the receiving position of the folding roller pair 133 is changed according to, for example, the predetermined number N of sheets P to be included in the sheet bundle Pb and size information including the size and thickness of the sheet P.

That is, as a previous stage of the center-folding step, when the folding blade 132 guides the sheet bundle Pb to a position between the rollers of the folding roller pair 133 (nip position), the controller 190 separates the rollers from each other so that the folding blade 132 and the sheet bundle Pb can pass between the rollers. For example, outer peripheries of the rollers are slightly separated from each other at the "receiving position" at which the rollers included in the folding roller pair 133 are located at this time.

Figure 6B:
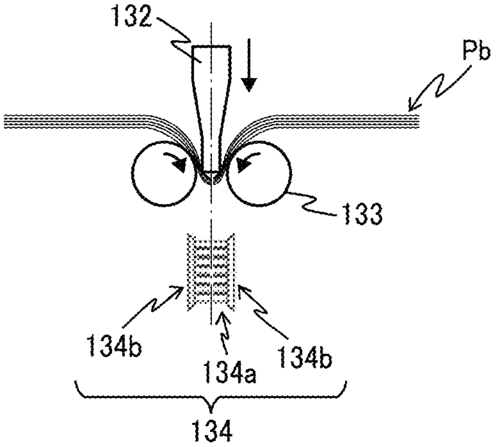

Subsequently, as illustrated in FIG. 6B, the folding blade 132 guides the sheet bundle Pb toward the nip position of the folding roller pair 133. At this time, the folding roller pair 133 is pressed against the folding blade 132 by the elastic force of a folding-roller-pair pressurizing member 144 (see FIG. 8). That is, the degree to which the sheet bundle Pb is pressed by the folding blade 132 is determined by the elastic force of the folding-roller-pair pressurizing member 144.

Information for adjusting the receiving position of the folding roller pair 133 (type and thickness of sheet P and number of sheets P to be included in one unit of sheet bundle Pb) is preset in the controller 190 via an operation panel 102. That is, at the time of starting the center-folding step, the controller 190 calculates an adjustment value based on the number of sheets P to be included in the sheet bundle Pb that has already been set, the type of sheet P (mainly a difference in thickness), and the like, and then, adds the thickness of the folding blade 132 to the adjustment value. The controller 190 uses the value thus obtained as a gap adjustment amount.

As illustrated in FIG. 6B, the folding blade 132 as a rack-type crimping blade advances while pushing the sheet bundle Pb toward the folding roller pair 133 for which the gap has been adjusted. At this time, the folding roller pair 133 as the center-folder rotates in accordance with the traveling speed (advancing speed) of the folding blade 132 while pressing the sheet bundle Pb in a direction orthogonal to the traveling direction. That is, the folding blade 132 and the sheet bundle Pb guided by the folding blade 132 that is advancing are pushed into the folding roller pair 133. When the sheet bundle Pb is pushed into the folding roller pair 133, the pushing position of the sheet bundle Pb is bent. Thus, the folding is executed. When the sheet bundle Pb is guided (pushed) between the folding roller pair 133 by the folding blade 132, the gap between the folding roller pair 133 is widened by an amount corresponding to a value twice as much as the thickness of the sheet bundle Pb.

Figure 6C:
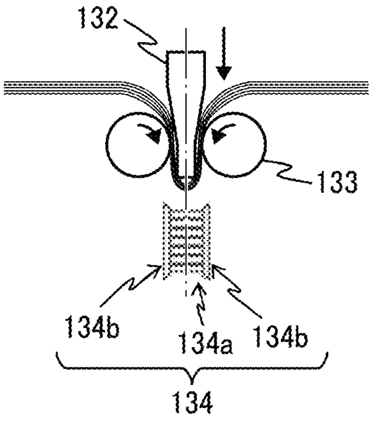

Furthermore, as illustrated in FIG. 6C, a tip of the folding blade 132 continues to advance to a position much beyond the nip position of the folding roller pair 133, and the center-folding process for the sheet bundle Pb proceeds. In this center-folding process, a part of the sheet bundle Pb (substantially central portion in the conveyance direction) serves as a fold portion Fp (see FIG. 9). When the center-folding step, which is the step illustrated in FIGS. 6B and 6C, is executed, the folding-blade engagement roller 134 is located at the retracted position separated from the tip of the folding blade 132 that has passed the nip position, as illustrated in FIG. 6C.

Figure 6D:
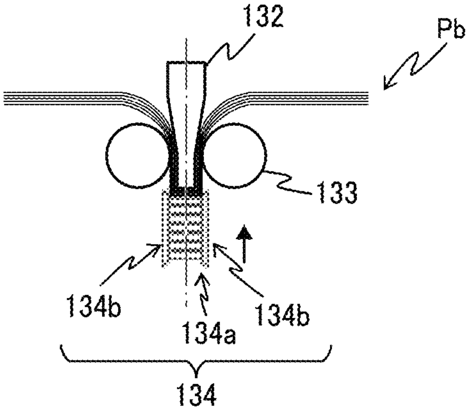

Subsequently, as illustrated in FIG. 6D, the folding-blade engagement roller 134 moves from the retracted position toward the folding blade 132. At this time, the folding-blade engagement roller 134 moves to an engagement position that is a position where the folding-blade engagement roller 134 and the folding blade 132 are in contact with each other via the sheet bundle Pb. When the folding-blade engagement roller 134 moves to the engagement position, a pressed state is established in which the sheet bundle Pb is sandwiched between the folding blade 132 and the folding-blade engagement roller 134. In this pressed state, the sheet bundle Pb is pressed from both sides such that protrusions and recesses formed on the folding blade 132 and protrusions and recesses formed on the circumferential surface of the folding-blade engagement roller 134 engage with each other, so that pressure bonding is performed.

In addition, the sheet bundle Pb is bent in a direction opposite to the traveling direction of the folding blade 132 by the action of the flange portions 134*b* of the folding-blade engagement roller 134 and the folding blade 132 while pressure bonding is being performed on the fold portion Fp of the sheet bundle Pb. The bending position (folding position) is defined by the flange portions 134*b*. Therefore, a back portion of the sheet bundle Pb is formed with a width corresponding to the distance between the flange portions 134*b* facing each other, with the center of the conveyance direction length as a starting point. Furthermore, a fold "f" (see FIG. 9) is formed as a fold line at each position of the flange portion 134*b*. At this time, the fold "f" is formed at two places with a back portion Cb interposed therebetween. That is, this step corresponds to a back-crimp-binding process of forming the back portion Cb while forming the two folds "f" and simultaneously performing crimp binding on the back portion Cb.

That is, the controller 190 causes the folding-blade engagement roller 134 to perform scanning in the width direction (main scanning direction) of the sheet bundle Pb while establishing the pressed state in which the sheet bundle Pb is pressed by the folding blade 132 and the folding-blade engagement roller 134 to form the back portion Cb. In the scanning in the width direction, the folding-blade engagement roller 134 moves while rotating. That is, the controller 190 causes the folding-blade engagement roller 134 to rotationally move in the width direction of the sheet bundle Pb in the state of pressing the back portion Cb against the folding blade 132 while forming the back portion Cb on the sheet bundle Pb. Thus, the controller 190 also controls the execution of the crimp-binding process. In this back-crimp-binding process, the flange portions 134*b* of the folding-blade engagement roller 134 and the folding blade 132 nip the sheet bundle Pb protruding in a thickness direction of the folding-blade engagement roller 134, in such a way as to enclose the sheet bundle Pb. As a result, it is possible to simultaneously perform crimp binding on the formed back portion Cb while forming a square back on the sheet bundle Pb. That is, the operation described with reference to FIG. 6D is a back-portion forming step and a back-crimp-binding step, and corresponds to a back-crimping step.

Figure 6E:
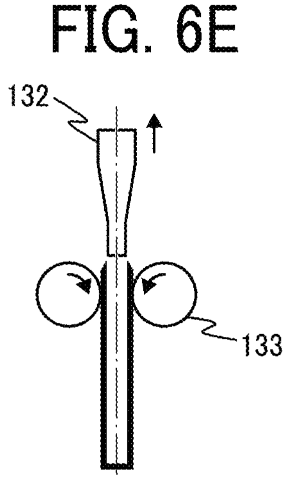

Finally, as illustrated in FIG. 6E, the controller 190 retracts the folding-blade engagement roller 134 in the width direction of the sheet bundle Pb, and also retracts the folding blade 132 to the retracted position. Then, the controller 190 rotates the folding roller pair 133 to convey the sheet bundle Pb so as to cause the sheet bundle Pb to pass between the folding roller pair 133, and ejects a crimp-saddle-stitched booklet with the back portion Cb subjected to crimp binding to the center-folded booklet ejection tray 136 (see FIG. 2).

As described above, in performing the saddle stitching on the sheet bundle Pb, the post-processing apparatus 110 according to the present embodiment first performs the center-folding process, and then performs a back-folding process of forming the back portion Cb of the center-folded sheet bundle Pb. Then, at the same time, the crimp-binding process is performed on the back portion Cb. That is, in the saddle-stitching method as an embodiment of the sheet processing method according to the present disclosure, the back-portion forming step is performed subsequent to the center-folding step, and a crimp-binding step (back-crimp-binding step) is simultaneously performed on the back portion Cb. As a result, unlike the conventional method, it is possible to form a crimp-saddle-stitched booklet that can be easily opened without causing a crimp-bound portion to be peeled off by a folding process and a page turning action.

Figure 7A:
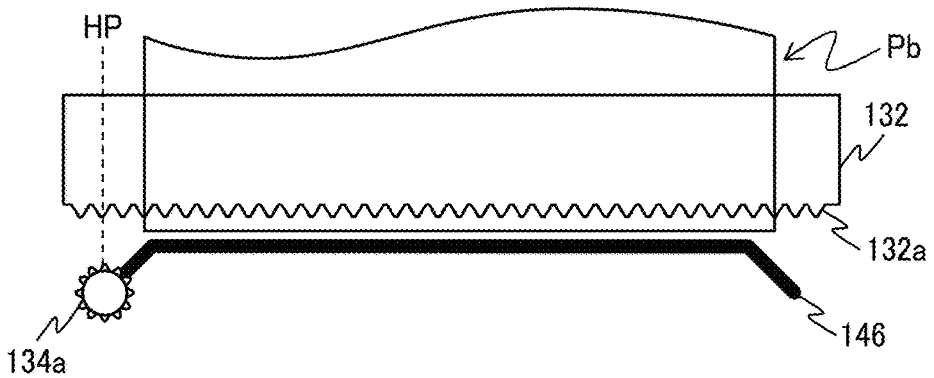
FIGS. 7A to 7C are cross-sectional views of the saddle-stitching unit, which illustrate operation of the saddle-stitching unit.
Figure 7B:
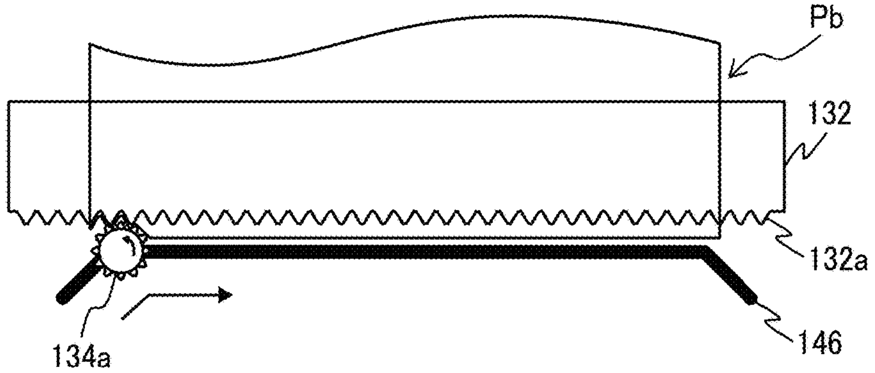
Figure 7C:
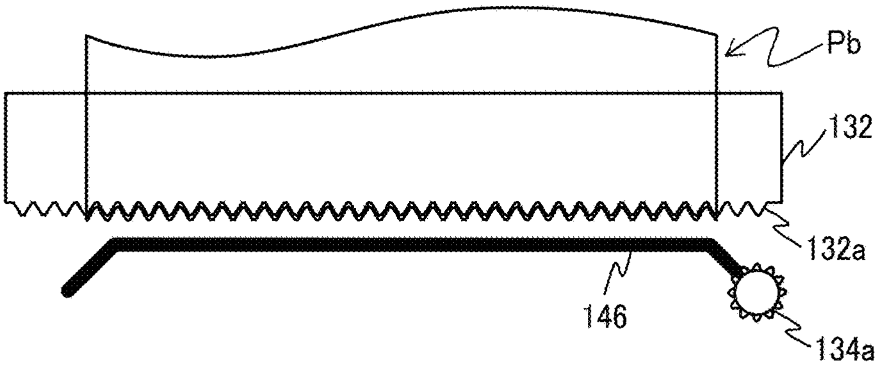

FIGS. 7A to 7C are cross-sectional views of the saddle-stitching unit viewed from the sheet conveyance direction side at a center position of the thickness of the folding blade 132, which illustrate operation of the saddle-stitching unit. The center position of the thickness of the folding blade 132 corresponds to a center line of center folding. The folding blade 132 has a folding-crimping teeth portion 132*a* on a sheet-material pressing surface facing the folding-blade engagement roller 134 in the traveling direction. The folding-crimping teeth portion 132*a* serves as folding-plate crimping teeth having a protruding-recessed shape.

FIG. 7A corresponds to the state illustrated in FIG. 6C. As already described, in the state illustrated in FIG. 6C, the folding blade 132 pushes the sheet bundle Pb to a position beyond the nip position of the folding roller pair 133.

When the sheet bundle Pb is pushed into the nip position of the folding roller pair 133 by the folding blade 132 and travels, the folding-blade engagement roller 134 stands by at a position on the outer side of the length in the width direction of the sheet bundle Pb formed into a booklet in the center-folding process performed on the sheet bundle Pb. The standby position at this time corresponds to the initial position (HP position). The folding-blade engagement roller 134 at the initial position (HP position) is on the outer side in the main scanning direction with respect to the sheet bundle Pb that advances while being pushed into the nip position of the folding roller pair 133. Thus, the initial position (HP position) corresponds to a position where the folding-blade engagement roller 134 is in a separated state of being separated from the sheet bundle Pb. Among the constituent elements of the folding-blade engagement roller 134, only the engaging-crimping teeth portion 134*a* is illustrated in FIGS. 7A to 7C.

Figure 9:
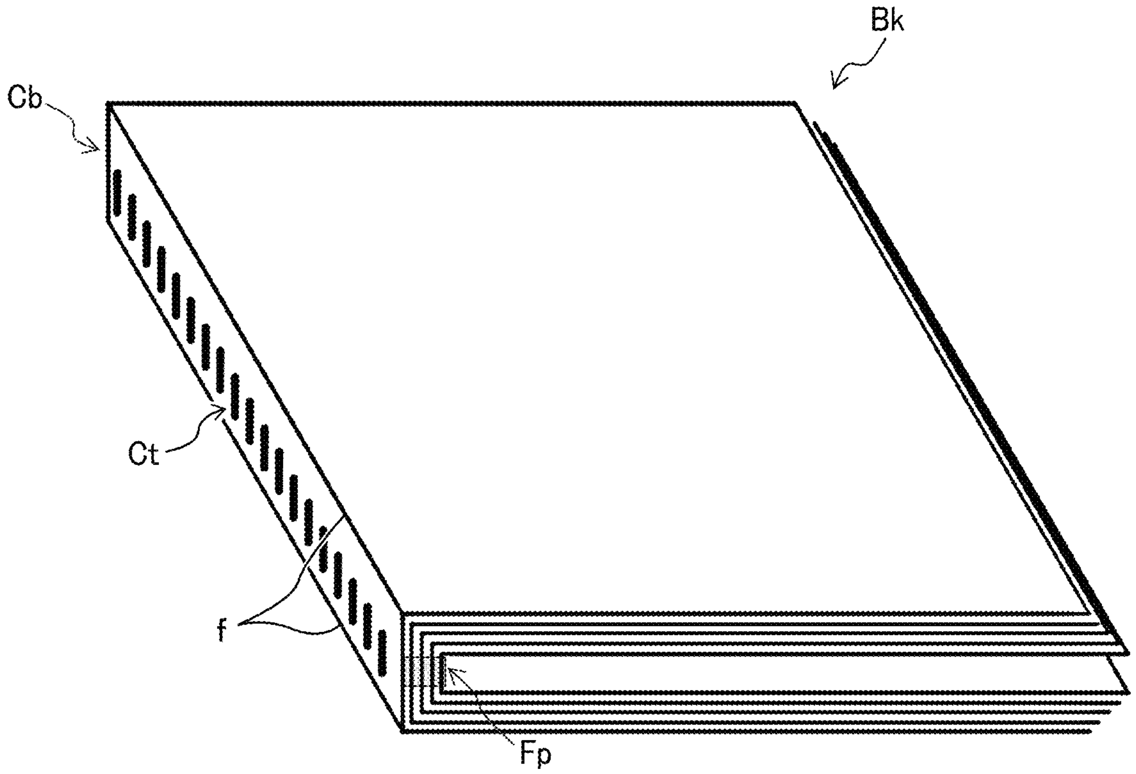
FIG. 9 is a schematic view of a crimp-saddle-stitched booklet bound in the first embodiment.

The folding-blade engagement roller 134 (engaging-crimping teeth portion 134*a*) is moved in the main scanning direction (width direction) by a folding-blade-engagement-roller scanning motor 145 (FIG. 9). The saddle-stitching unit is provided with an engagement-roller guide rail 146 as a folding-blade-engagement-roller contacting/separating mechanism. The engaging-crimping teeth portion 134*a* of the folding-blade engagement roller 134 moves in the main scanning direction along the engagement-roller guide rail 146.

The engagement-roller guide rail 146 is longer than the sheet bundle Pb in the main scanning direction, and portions located on the outer side of the edges of the sheet bundle Pb in the main scanning direction are separated from the fold portion of the sheet bundle Pb that has passed through the nip position of the folding roller pair 133. Furthermore, the engagement-roller guide rail 146 approaches the fold portion of the sheet bundle Pb that has passed through the nip position of the folding roller pair 133, in a portion located on the inner side of the edges of the sheet bundle Pb in the main scanning direction.

Therefore, the engaging-crimping teeth portion 134*a* of the folding-blade engagement roller 134 is out of contact with the fold portion formed on the sheet bundle Pb, at the edges of the sheet bundle Pb and on the outer side of the edges of the sheet bundle Pb in the main scanning direction, and moves such that the engaging-crimping teeth portion 134*a* and the folding blade 132 nip the fold portion on the inner side of the edges in the main scanning direction. Then, the engaging-crimping teeth portion 134*a* moves in the main scanning direction along the engagement-roller guide rail 146. As a result, points on the fold portion of the sheet bundle Pb at which the sheet bundle Pb is sandwiched between the engaging-crimping teeth portion 134*a* and the folding blade 132 are sequentially crimped and bound.

The controller places the roller outside an edge of the sheet bundle in the main scanning direction before performing the crimp-binding process and after the crimp-binding process.

FIG. 7B corresponds to the state of FIG. 6D, and corresponds to a pressurized state in which the engaging-crimping teeth portion 134*a* of the folding-blade engagement roller 134 is pressed by the folding blade 132 to press and deform the sheet bundle Pb sandwiched between the engaging-crimping teeth portion 134*a* and the folding blade 132. When the folding-blade engagement roller 134 is at the fold portion of the sheet bundle Pb and scanning is performed while the back portion Cb is being formed by the folding-blade engagement roller 134, the folding roller pair 133 is in a pressurized state in which the sheet bundle Pb is nipped by the folding roller pair 133 and does not move so that the sheet bundle Pb is not pushed back. The controller 190 executes control so as to maintain the pressurized state of the folding roller pair 133. That is, when the crimp-saddle-stitching process is performed on the sheet bundle Pb, the folding roller pair 133 is controlled in such a way as to maintain the pressurized state so that the folding blade 132 does not retract by being pressurized by the folding-blade engagement roller 134.

Then, when the folding blade 132 is pressed by the folding-blade engagement roller 134, the engaging-crimping teeth portion 134*a* of the folding-blade engagement roller 134 engages with the folding-crimping teeth portion 132*a* provided on a pushing surface of the folding blade 132 in such a way as to nip the sheet bundle Pb. As a result, the back portion Cb of the sheet bundle Pb is intermittently pressed and deformed in the main scanning direction to execute the crimp-binding process.

On the folding-crimping teeth portion 132*a*, protrusions and recesses are arranged at predetermined intervals in the main scanning direction as with rack teeth of a rack-and-pinion mechanism. When the folding-blade engagement roller 134 is scanned in the main scanning direction by the folding-blade-engagement-roller scanning motor 145 (FIG. 9), the position of engagement between the engaging-crimping teeth portion 134*a* of the folding-blade engagement roller 134 and the folding-crimping teeth portion 132*a* of the folding blade moves in the main scanning direction. As the engaging position (engagement position) moves, the crimp-binding process is performed on the back portion Cb of the sheet bundle Pb. While the crimp-binding process is being performed, the folding roller pair 133 is kept pressed toward the nip position so that the folding-blade engagement roller 134 can reciprocally move in the main scanning direction while maintaining the engagement position. This prevents the sheet bundle Pb and the folding blade 132 from escaping by being pressed by the folding-blade engagement roller 134.

As described above, when the engaging-crimping teeth portion 134*a* approaches the back portion Cb formed on the sheet bundle Pb, the engaging-crimping teeth portion 134*a* moves in an oblique direction from the outer side in the width direction of the sheet bundle Pb toward the back portion Cb. As a result, the engaging-crimping teeth portion 134*a* approaches from a direction in which the engaging-crimping teeth portion 134*a* does not collide with a width-directional end of the back portion Cb of the sheet bundle Pb, and the position of engagement with the folding-crimping teeth portion 132*a* of the folding blade 132 starts from the inner side of a width-directional edge of the sheet bundle Pb. As a result, it is possible to prevent the edge of the sheet bundle Pb from being turned up when passing through the edge.

In FIG. 7C, after the crimp binding is performed on the back portion Cb of the sheet bundle Pb, the engaging-crimping teeth portion 134*a* reaches a position on the outer side of the other width-directional edge of the sheet bundle Pb in the main scanning direction, and is separated from the folding-crimping teeth portion 132*a* in a center-folding ejection direction.

When the crimp-saddle stitching is successively performed on a next sheet bundle Pb, the engaging-crimping teeth portion 134*a* moves in a reverse direction in the main scanning direction. In other words, the engaging-crimping teeth portion 134*a* moves from left to right for an odd-numbered sheet bundle Pb in FIG. 7B, and the engaging-crimping teeth portion 134*a* moves from right to left for an even-numbered sheet bundle Pb in FIG. 7B.

The folding-blade-engagement-roller contacting/separating mechanism according to the present embodiment has been exemplified by the configuration including the engagement-roller guide rail 146 and the folding-blade-engagement-roller scanning motor 145 (FIG. 10), but the mechanism is not limited thereto. A moving motor may be further provided which moves the folding-blade engagement roller 134 such that the folding-blade engagement roller 134 can advance and retract in the center-folding ejection direction.

Figure 8:
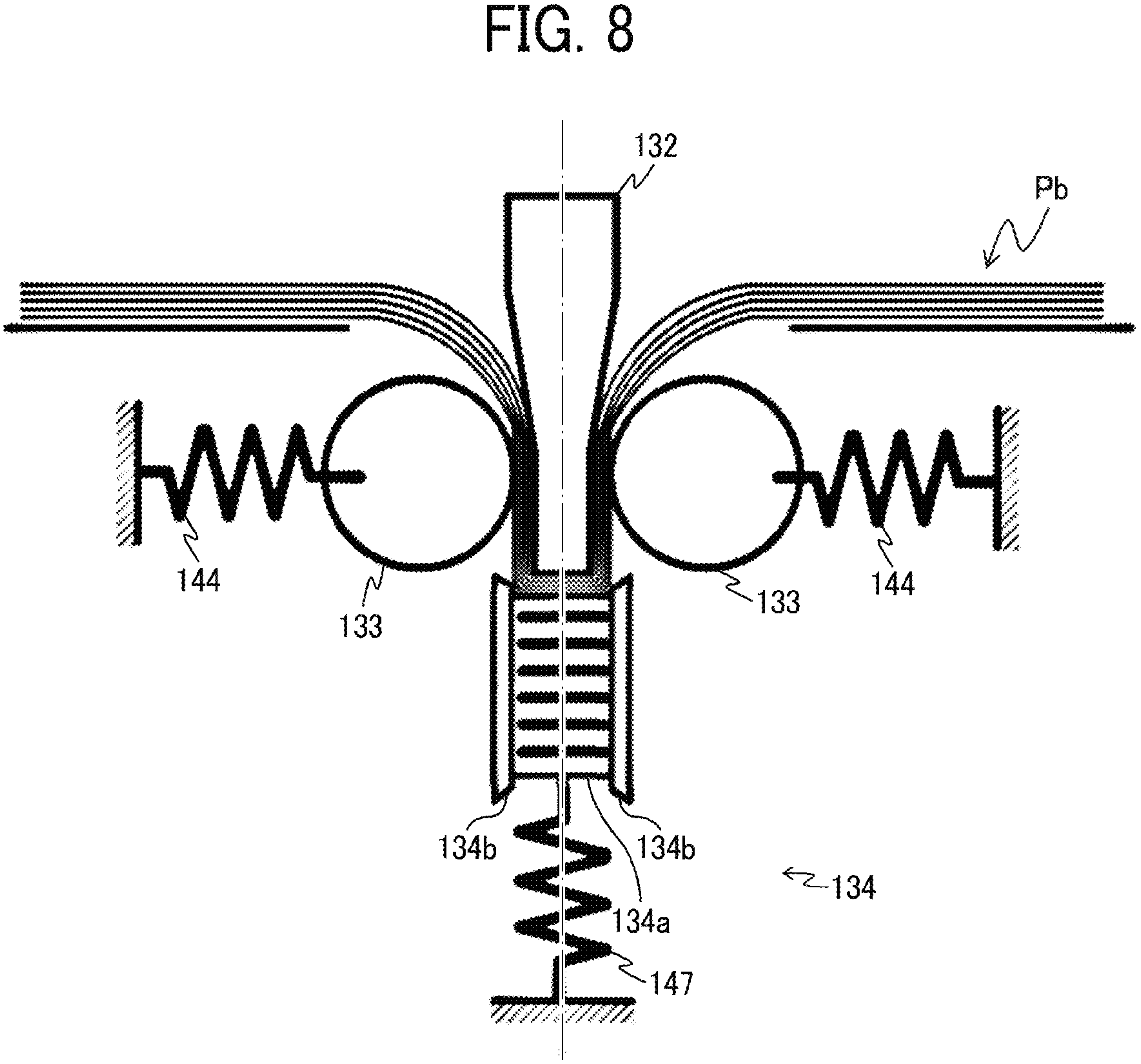
FIG. 8 is a schematic diagram illustrating a state of pressing performed by the saddle-stitching unit.

FIG. 8 is a schematic diagram illustrating a state of the sheet bundle Pb being pressed by the saddle-stitching unit. The folding roller pair 133 nips the folding blade 132 and the sheet bundle Pb, and is biased toward the folding blade 132 by the folding-roller-pair pressurizing member 144. The folding-roller-pair pressurizing member 144 is an elastic member such as a spring. Therefore, the folding-roller-pair pressurizing member 144 can be pushed back by elasticity while pressing the folding roller pair 133 toward the folding blade 132 when the folding blade 132 and the sheet bundle Pb travel between the folding roller pair 133.

In the states of FIGS. 6B and 6C, the folding roller pair 133 conveys the sheet bundle Pb while pressing the sheet bundle Pb toward the folding blade 132. Therefore, the fold portion is pushed by a traveling-direction end of the folding blade 132 while the sheet bundle Pb is passing between the folding roller pair 133. Thus, the folding process is performed on the sheet bundle Pb. In addition, in the state of FIG. 6D, at the time of crimp binding, the sheet bundle Pb is held by the folding-blade engagement roller 134 in a state where the folding roller pair 133 presses the sheet bundle Pb.

The folding-blade engagement roller 134 is pressed by a folding-blade-engagement-roller pressurizing member 147 toward the folding blade 132 with the sheet bundle Pb interposed between the folding-blade engagement roller 134 and the folding blade 132. By use of this pressing force, crimp binding is performed by the engaging-crimping teeth portion 134*a* of the folding-blade engagement roller 134. Then, when being pressed toward the folding blade 132 by the engaging-crimping teeth portion 134*a*, portions of the sheet bundle Pb sandwiched between thickness-directional ends of the folding blade 132 and the flange portions 134*b* are directed in a direction along the folding blade 132. As a result, the portion of the sheet bundle Pb sandwiched between each flange portion 134*b* and the folding blade 132 is bent. This bending direction is opposite to a direction in which the folding blade 132 advances. At this time, a bent portion is formed at two positions spaced at a predetermined interval in the thickness direction of the folding blade 132. Thus, a square back is formed on the sheet bundle Pb by the crimp-saddle-stitching operation. That is, square-back folding is executed by the crimp-binding process.

A sheet processing apparatus includes: a center-folder to perform a center-folding process on a sheet bundle including multiple sheet materials; a back-crimp binder to: form a back portion on the sheet bundle subjected to the center-folding process; and perform a crimp-binding process on the back portion; and a controller configured to: cause the center-folder to perform the center-folding process; and cause the back-crimp binder to perform the crimp-binding process on the back portion while forming the back portion on the sheet bundle in the crimp-binding process.

The center-folder includes: a folding plate to guide a part of the sheet bundle in a first direction; a folding-roller pair to: nip the sheet bundle guided by the folding plate at a nip position; and advance the sheet bundle in the first direction; and a pressure mechanism to pressurize the folding-roller pair toward the nip position in a second direction intersecting the first direction, wherein the controller is further configured to: set the folding-roller pair at a receiving position at which the folding-roller pair is separated for a separation amount in the second direction; and cause the folding plate to advance, in the first direction, the part of the sheet bundle toward the nip position at which the folding-roller pair are at the receiving position and separated for the separation amount.

Booklet Bk FIG. 9 is a perspective view of a booklet Bk that exemplifies a booklet to be formed by the above-described crimp-saddle-stitching operation. As illustrated in FIG. 9, the sheet bundle Pb is bent at the fold portion Fp in the center-folding process performed on the sheet bundle Pb. Thus, the booklet Bk is formed, and a square back is formed on the back portion Cb. Crimp marks Ct are formed on the back portion Cb at predetermined intervals in a longitudinal direction of the back portion Cb. The crimp marks Ct are made as a result of pressure deformation by the engaging-crimping teeth portion 134*a* and the folding blade 132. The crimp marks Ct can be formed at a position overlapping the position (fold portion Fp) where the sheet bundle Pb has been folded in the center-folding step performed on the sheet bundle Pb to have a folded center. In the booklet Bk, portions that move when the page turning action is performed correspond to the two folds "f" forming the back portion Cb. The two folds "f" are formed near both sides of the crimp marks Ct.

Therefore, the booklet Bk to be formed in the saddle stitching and the crimp-binding process according to the present embodiment has a structure in which the folds "f" prevent a load from being applied to a crimped portion when a page is turned by a page turning action, and thus, has a structure in which a bound portion is not peeled off by the page turning action. In addition, since the folds "f" are formed at two positions with the back portion Cb interposed therebetween, either of the folds "f" formed at the two positions is movable in the page turning action. The fold "f" is at a position not overlapping with the fold portion Fp pushed into the nip position of the folding roller pair 133 by the folding blade 132. The fold portion Fp is at a binding position of the crimp-binding process.

Therefore, when page turning actions are performed, pages are turned at the folds "f", and the fold portion Fp corresponding to a central portion of an opened booklet Bk is in a bound state. Therefore, no page is turned across the binding position. That is, since center-folding lines (folds "f") are disposed symmetrically on both sides of the binding position, a double-page spread can be evenly formed. Thus, the quality of the booklet Bk is also maintained.

Figure 10:
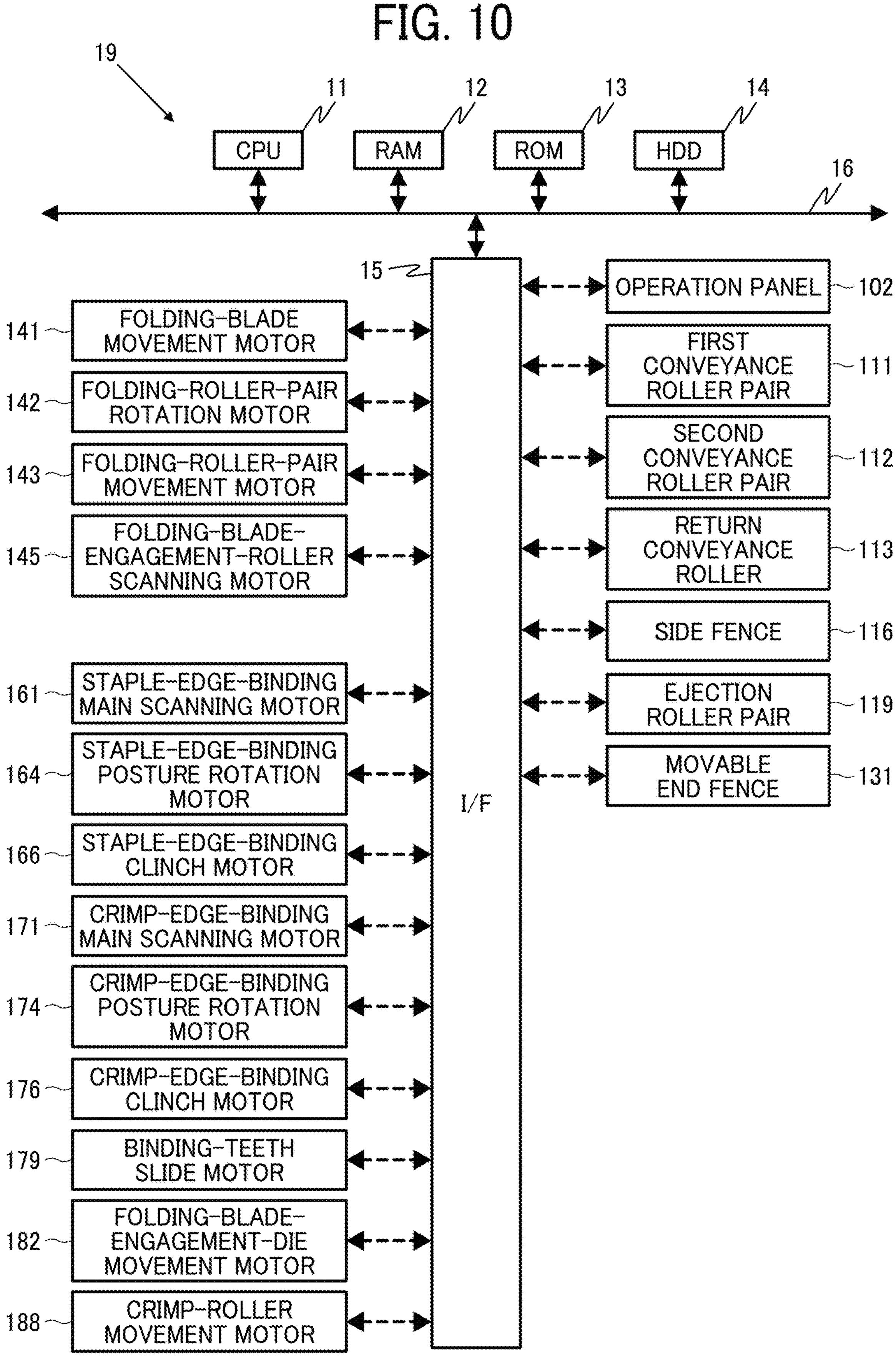
FIG. 10 is a hardware configuration diagram of a controller of the post-processing apparatus.

Control Configuration FIG. 10 is a hardware configuration diagram of the controller 190 that controls operation of the post-processing apparatus 110 according to the first embodiment. As illustrated in FIG. 10, the controller 190 has a configuration in which a central processing unit (CPU) 11, a random access memory (RAM) 12, a read only memory (ROM) 13, a hard disk drive (HDD) 14, and an interface (I/F) 15 are connected via a common bus 16.

The CPU 11 is an arithmetic unit, and controls the entire operation of the post-processing apparatus 110. The RAM 12 is a volatile storage medium that allows information to be read and written at a high speed, and is used as a work area when the CPU 11 processes information. The ROM 13 is a read-only nonvolatile storage medium, and stores programs such as firmware. The HDD 14 is a nonvolatile storage medium that has a large storage capacity, and allows the reading and writing of information. An operating system (OS), various control programs, application programs, and the like are stored in the HDD 14.

The post-processing apparatus 110 processes, for example, a control program stored in the ROM 13 and an information processing program (application program) loaded from a storage medium such as the HDD 14 into the RAM 12, by an arithmetic function of the CPU 11. The processing implements a software control unit including various functional modules of the post-processing apparatus 110. A combination of the software control unit configured in this manner and hardware resources mounted on the post-processing apparatus 110 forms functional blocks that implement the function of the post-processing apparatus 110. That is, the CPU 11, the RAM 12, the ROM 13, and the HDD 14 form a controller 19 (control unit) that controls operation of the post-processing apparatus 110.

The I/F 15 is an interface that connects, to the common bus 16, the first conveyance roller pair 111, the second conveyance roller pair 112, the return conveyance roller 113, the side fences 116, the ejection roller pair 119, the movable end fence 131, the folding-blade movement motor 141, the folding-roller-pair rotation motor 142, the folding-roller-pair movement motor 143, the folding-blade-engagement-roller scanning motor 145, the staple-edge-binding main scanning motor 161, the staple-edge-binding posture rotation motor 164, the staple-edge-binding clinch motor 166, the crimp-edge-binding main scanning motor 171, the crimp-edge-binding posture rotation motor 174, the crimp-edge-binding clinch motor 176, the binding-teeth slide motor 179, a crimp-roller movement motor 188, and the operation panel 102.

The controller 19 causes the first conveyance roller pair 111, the second conveyance roller pair 112, the return conveyance roller 113, the side fences 116, the ejection roller pair 119, the movable end fence 131, the folding-blade movement motor 141, the folding-roller-pair rotation motor 142, the folding-roller-pair movement motor 143, the folding-blade-engagement-roller scanning motor 145, the staple-edge-binding main scanning motor 161, the staple-edge-binding posture rotation motor 164, the staple-edge-binding clinch motor 166, the crimp-edge-binding main scanning motor 171, the crimp-edge-binding posture rotation motor 174, the crimp-edge-binding clinch motor 176, the binding-teeth slide motor 179, and the crimp-roller movement motor 188 to operate, through the I/F 15.

As already described with reference to FIG. 1, the image forming apparatus 101 includes the operation panel 102. The operation panel 102 includes an operation device and a display (notification unit). The operation device receives an input operation from a user. The display notifies the user of information. The operation device includes, for example, physical input buttons and a touch screen overlaid on a display. Then, the operation panel 102 acquires information from the user through the operation device, and provides information to the user through the display. A specific example of the notification unit is not limited to the display, and may be a light emitting diode (LED) lamp or a speaker. The post-processing apparatus 110 may include the same operation panel 102 as described above.

First Modification

Next, a first modification of the saddle-stitching unit will be described with reference to FIGS. 11, 12A, and 12B. A saddle-stitching unit according to the first modification differs from the saddle-stitching unit according to the first embodiment in that a folding-blade engagement member includes a folding-blade engagement die 181 as a blade member extending in the width direction, instead of a roller member that performs scanning (rotationally moves). Note that constituent elements common to the saddle-stitching units according to the present modification and the first embodiment are denoted by the same reference numerals, and detailed description thereof will be omitted.

Figure 11:
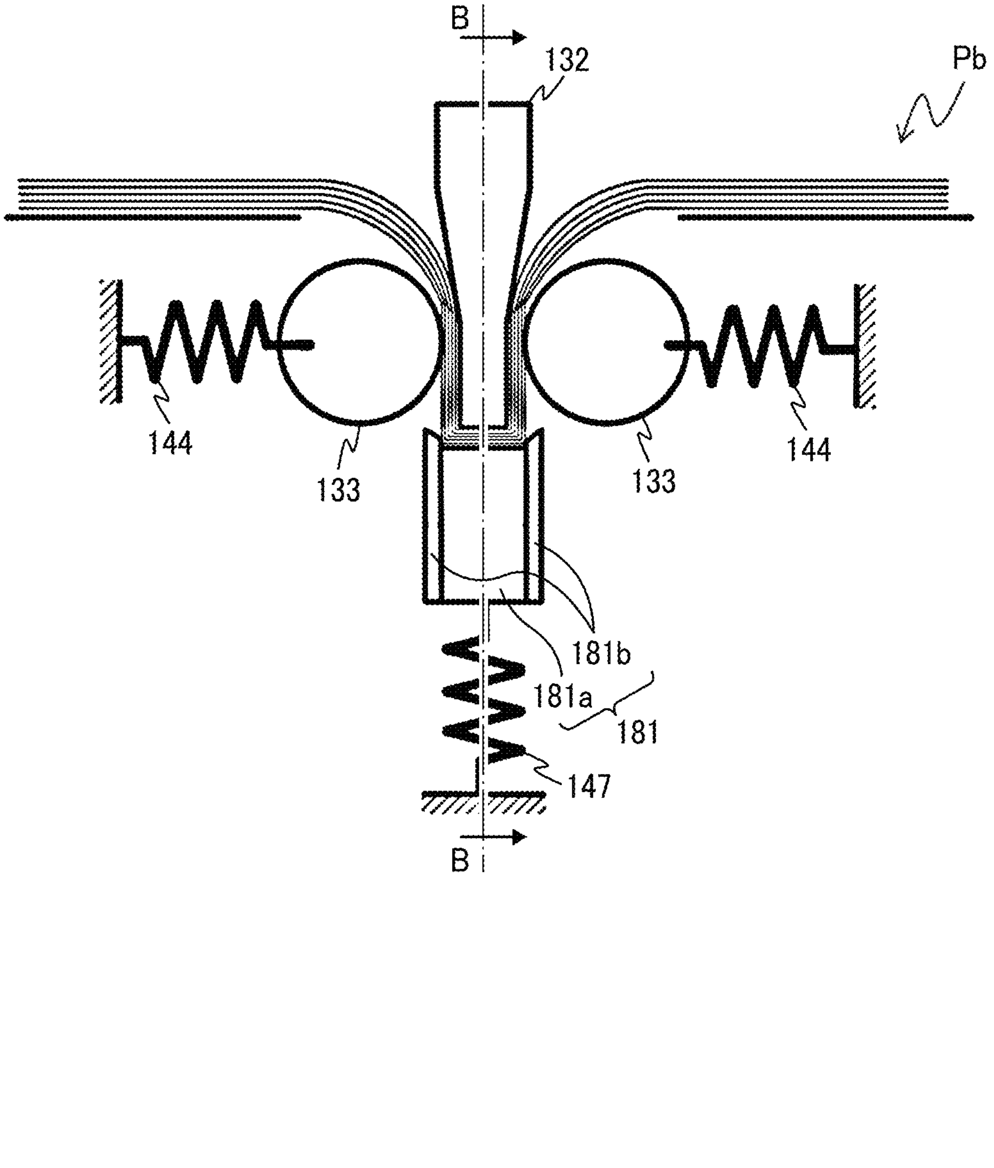
FIG. 11 is a schematic diagram illustrating a first modification of the saddle-stitching unit.

FIG. 11 is a schematic diagram illustrating the first modification of the saddle-stitching unit. The folding roller pair 133 is pressed against each other by the folding-roller-pair pressurizing member 144 while nipping the folding blade 132 and the sheet bundle Pb.

In addition, the folding-blade engagement die 181 is pressed by the folding-blade-engagement-roller pressurizing member 147 toward the folding blade 132 with the sheet bundle Pb interposed between the folding-blade engagement die 181 and the folding blade 132. By use of this pressing force, crimp binding can be performed by a die-crimping portion 181*a* of the folding-blade engagement die 181, and square-back folding can be performed by flange portions 181*b*.

Figure 12A:
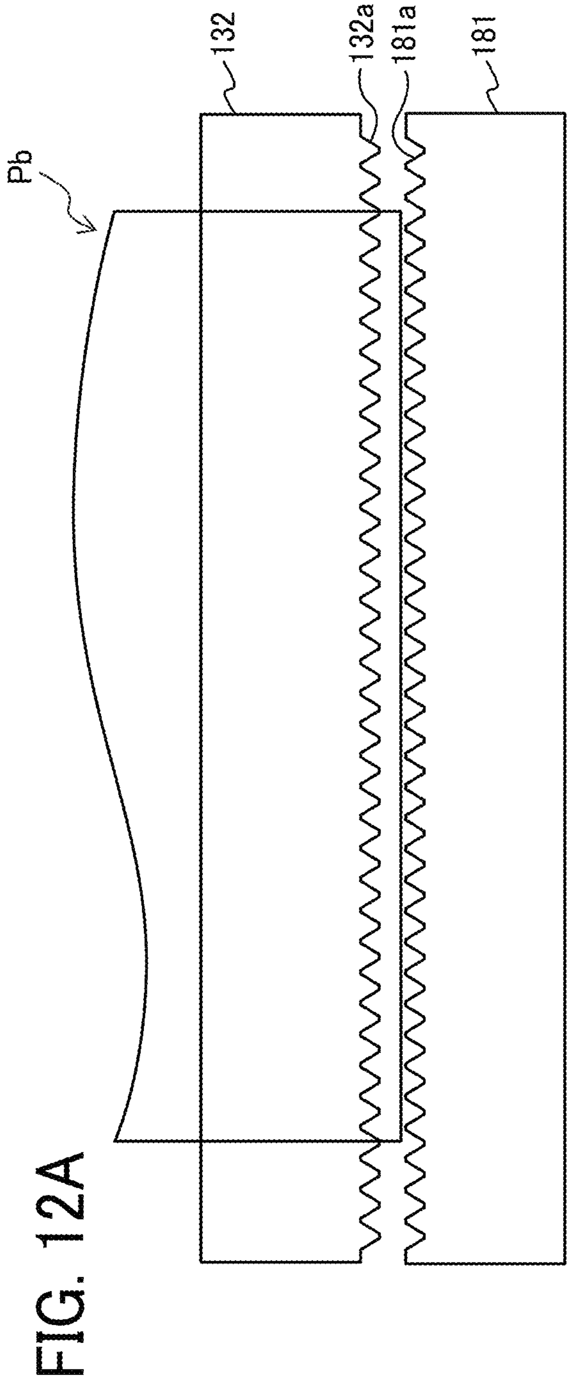
FIGS. 12A and 12B are cross-sectional views taken along line B-B, which illustrate operation of the saddle-stitching unit according to the first modification.
Figure 12B:
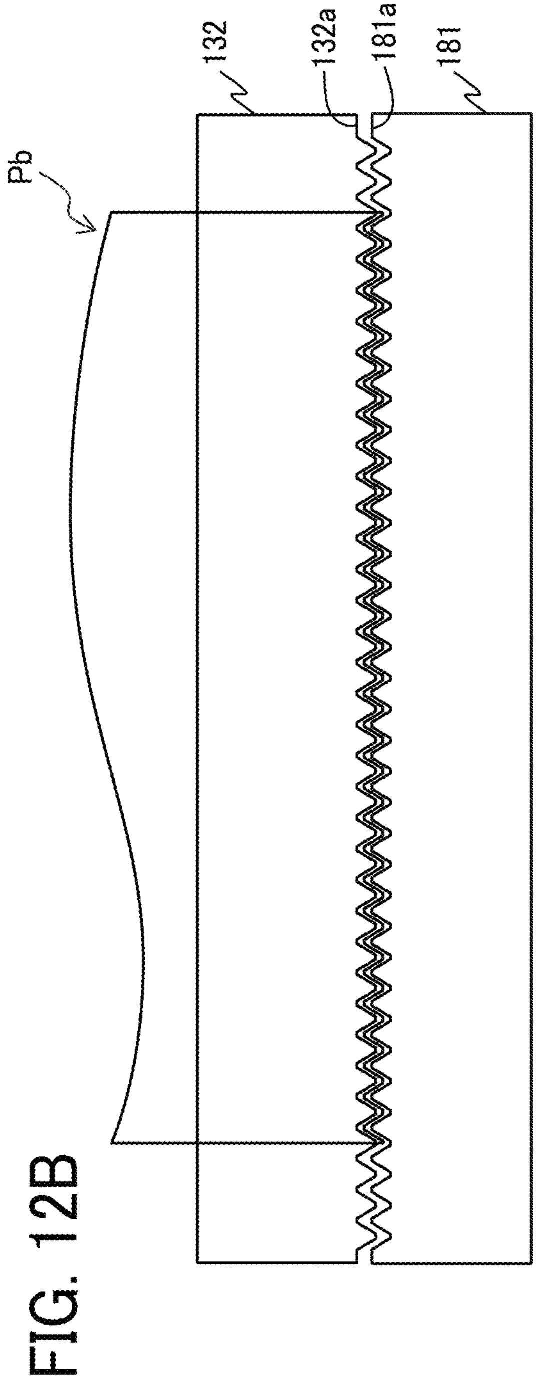

FIGS. 12A and 12B are cross-sectional views of the saddle-stitching unit according to the first modification, which illustrate operation of the saddle-stitching unit. FIGS. 12A and 12B are cross-sectional views of the saddle-stitching unit taken along line B-B as viewed from the sheet conveyance direction side at the center line of center folding, that is, at the center position of the thickness of the folding blade 132. FIG. 12A corresponds to the state of FIG. 6C. The folding blade 132 has pushed the sheet bundle Pb to a position beyond the nip position of the folding roller pair 133. The folding-blade engagement die 181 is located at the standby position (HP position), and is separated from the sheet bundle Pb in the center-folding ejection direction.

The folding-blade engagement die 181 is moved toward the folding blade by a folding-blade-engagement-die movement motor 182.

FIG. 12B corresponds to the state of FIG. 6D. The folding-blade engagement die 181 is pressed against the folding blade 132 with the sheet bundle Pb interposed therebetween. Thus, the teeth of the die-crimping portion 181*a* of the folding-blade engagement die 181 and the folding-crimping teeth portion 132*a* provided on the pushing surface of the folding blade 132 are engaged with each other with the sheet bundle Pb interposed therebetween. When the folding-blade engagement die 181 is pressurized by a folding-blade-engagement-die pressurizing member 183, the back portion of the sheet bundle Pb is crimped and bound.

Second Modification

Next, a second modification of the saddle-stitching unit will be described with reference to FIGS. 13A and 13B. A saddle-stitching unit according to the second modification differs from the saddle-stitching unit according to the first modification in that crimping teeth in a protruding-recessed shape are not uniformly disposed in the width direction but partially (intermittently) disposed. Note that constituent elements common to the saddle-stitching units according to the present modification and the first embodiment are denoted by the same reference numerals, and detailed description thereof will be omitted.

Figure 13A:
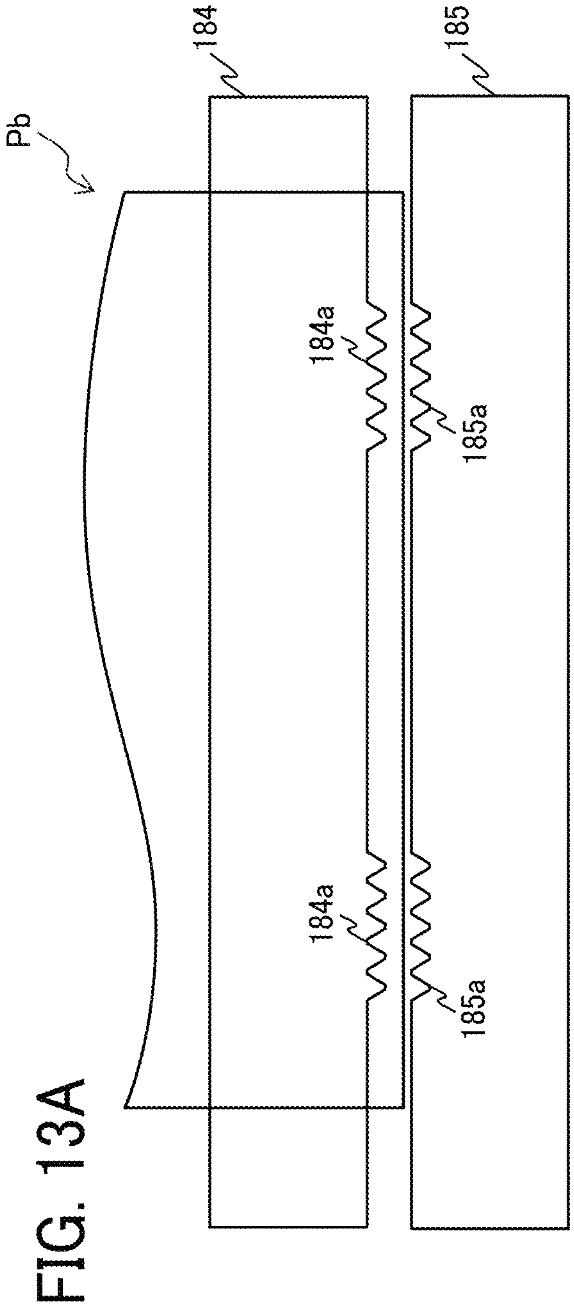
FIGS. 13A and 13B are cross-sectional views of a saddle-stitching unit according to a second modification, which illustrate operation of the saddle-stitching unit.
Figure 13B:
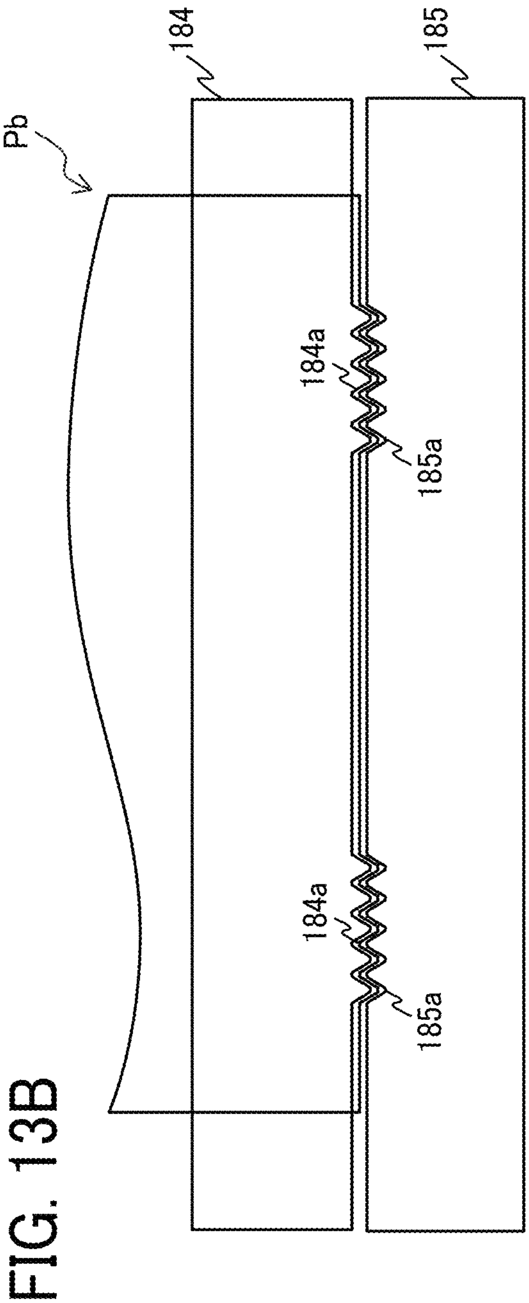

FIGS. 13A and 13B are cross-sectional views of the saddle-stitching unit according to the second modification, which illustrate operation of the saddle-stitching unit. FIGS. 13A and 13B are cross-sectional views of the saddle-stitching unit according to the second modification viewed from the sheet conveyance direction side at the center line of center folding, that is, at the center position of the thickness of the folding blade 132. FIG. 13A corresponds to the state of FIG. 6C. A folding blade 184 has pushed the sheet bundle Pb to a position beyond the nip position of the folding roller pair 133. A folding-blade engagement die 185 is located at the standby position (HP position), and is separated from the sheet bundle Pb in the center-folding ejection direction.

The folding-blade engagement die 185 is moved toward the folding blade by the folding-blade-engagement-die movement motor 182.

FIG. 13B corresponds to the state of FIG. 6D. The folding-blade engagement die 185 is pressed against the folding blade 184 with the sheet bundle Pb interposed therebetween. Thus, the teeth of a die-crimping portion 185*a* of the folding-blade engagement die 185 and teeth 184*a* provided on a pushing surface of the folding blade 184 are engaged with each other with the sheet bundle Pb interposed therebetween. When the folding-blade engagement die 185 is pressurized by the folding-blade-engagement-die pressurizing member 183, the back portion of the sheet bundle Pb is crimped and bound.

Third Modification

Next, a third modification of the saddle-stitching unit will be described with reference to FIGS. 14A and 14B. A saddle-stitching unit according to the third modification differs from the saddle-stitching unit according to the first modification in that a folding-blade engagement member is configured such that the folding-blade engagement member does not linearly move to and engage with the folding blade 132 while facing the folding blade 132, but moves on a rotational trajectory so that crimping teeth in a protruding-recessed shape sequentially engage with each other. Note that constituent elements common to the saddle-stitching units according to the present modification and the first embodiment are denoted by the same reference numerals, and detailed description thereof will be omitted.

Figure 14A:
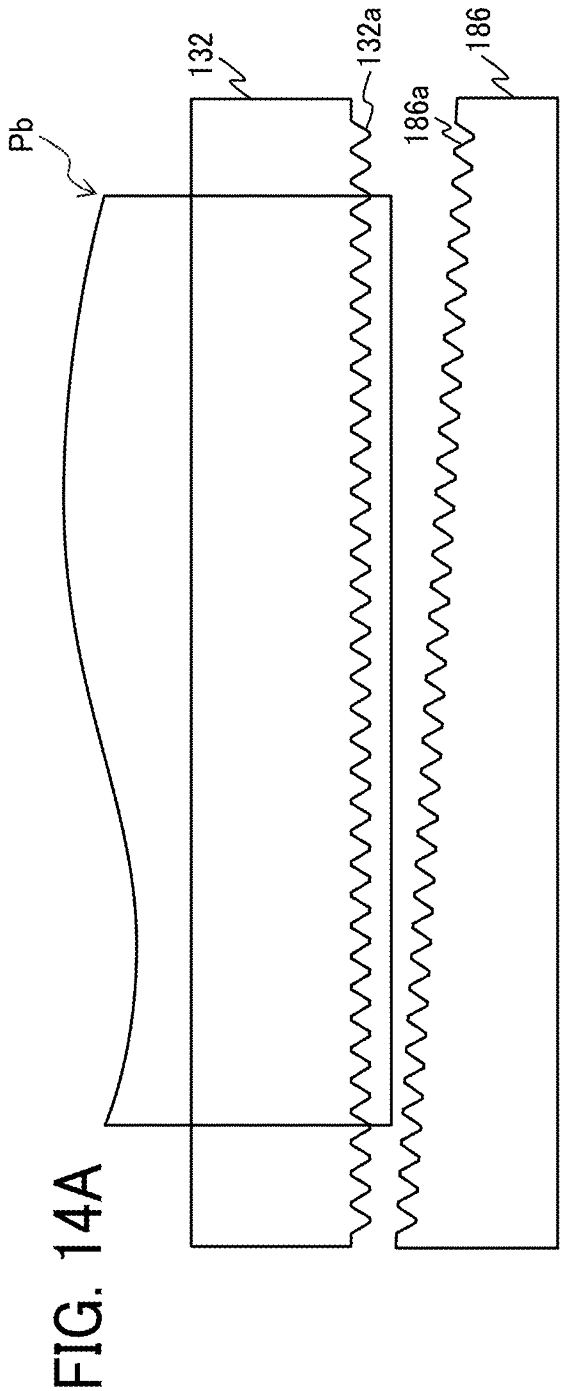
FIGS. 14A and 14B are cross-sectional views of a saddle-stitching unit according to a third modification, which illustrate operation of the saddle-stitching unit.
Figure 14B:
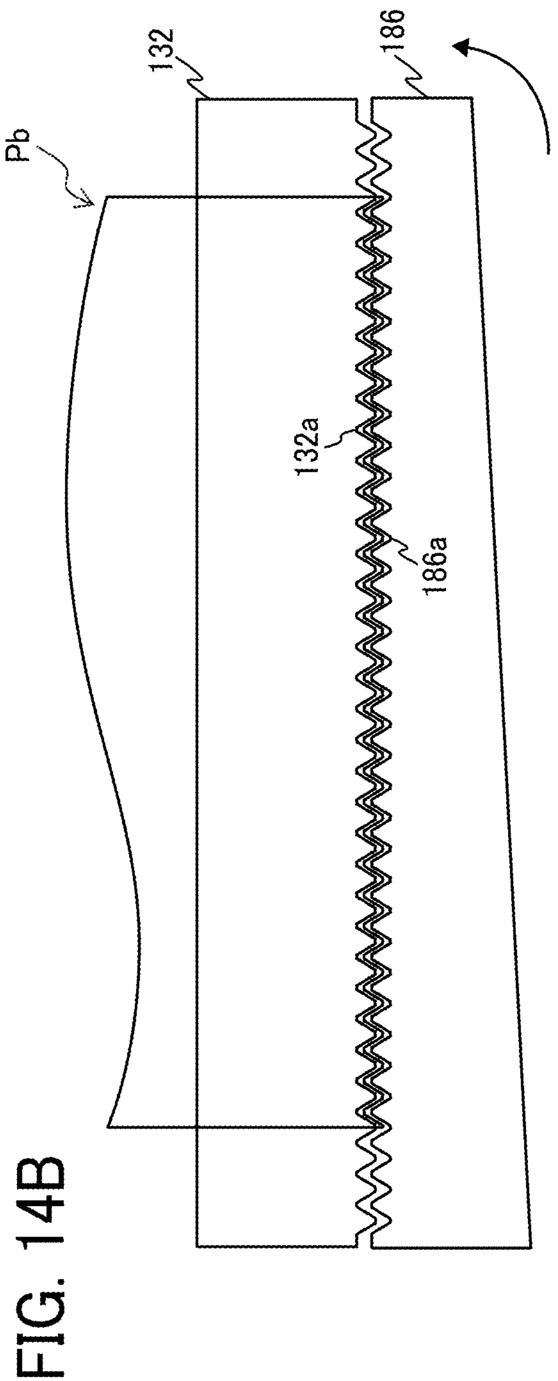

FIGS. 14A and 14B are cross-sectional views of the saddle-stitching unit according to the third modification, which illustrate operation of the saddle-stitching unit. FIGS. 14A and 14B are cross-sectional views of the saddle-stitching unit according to the third modification viewed from the sheet conveyance direction side at the center line of center folding, that is, at the center position of the thickness of the folding blade 132. FIG. 14A corresponds to the state of FIG. 6C. The folding blade 132 has pushed the sheet bundle Pb to a position beyond the nip position of the folding roller pair 133. A folding-blade engagement die 186 is located at the standby position (HP position), and is separated from the sheet bundle Pb in the center-folding ejection direction.

The folding-blade engagement die 186 is moved toward the folding blade by the folding-blade-engagement-die movement motor 182, and is moved on a rotational trajectory so that the teeth sequentially engage with each other.

FIG. 14B corresponds to the state of FIG. 6D. The folding-blade engagement die 186 is pressed against the folding blade 132 with the sheet bundle Pb interposed therebetween. Thus, the teeth of a crimping portion 186*a* of the folding-blade engagement die and the folding-crimping teeth portion 132*a* provided on the pushing surface of the folding blade 132 are engaged with each other with the sheet bundle Pb interposed therebetween. When the folding-blade engagement die 186 is pressurized by the folding-blade-engagement-die pressurizing member 183, the back portion of the sheet bundle Pb is crimped and bound.

Note that the crimping portion 186*a* of the folding-blade engagement die is not a flat surface but a curved surface. Thus, teeth may be provided on the curved surface, and the crimping portion 186*a* may be moved on a rotational trajectory so that the teeth sequentially engage with each other.

As described above, the teeth sequentially engage with each other. As a result, the pressurizing force to be applied at the time of crimp binding can be reduced, and thus, the apparatus can be downsized.

Fourth Modification

Next, a fourth modification of the saddle-stitching unit will be described with reference to FIGS. 15A to 15C. A saddle-stitching unit according to the fourth modification differs from the saddle-stitching unit according to the first embodiment in that the folding blade 132 includes a crimp roller 187 having teeth disposed on an outer periphery to be scanned by a tip portion in the main scanning direction. Note that constituent elements common to the saddle-stitching units according to the present modification and the first embodiment are denoted by the same reference numerals, and detailed description thereof will be omitted.

Figure 15A:
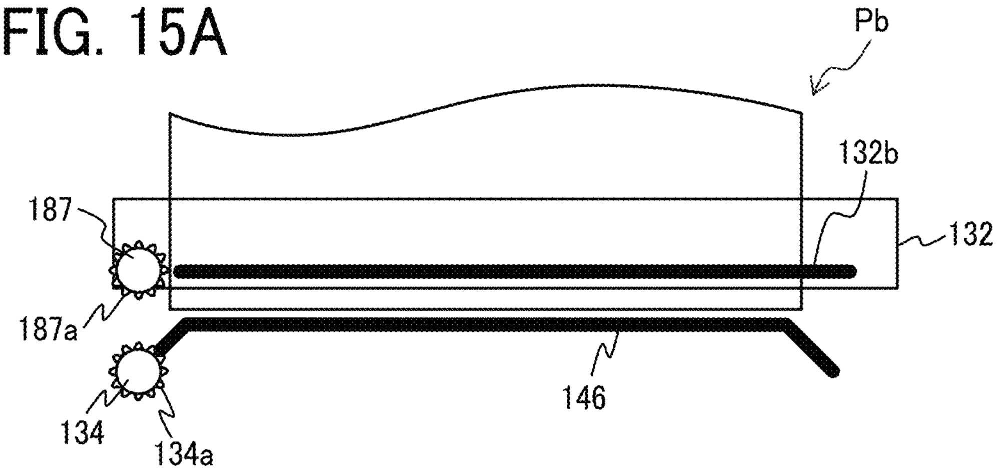
FIGS. 15A to 15C are cross-sectional views of a saddle-stitching unit according to a fourth modification, which illustrate operation of the saddle-stitching unit.
Figure 15B:
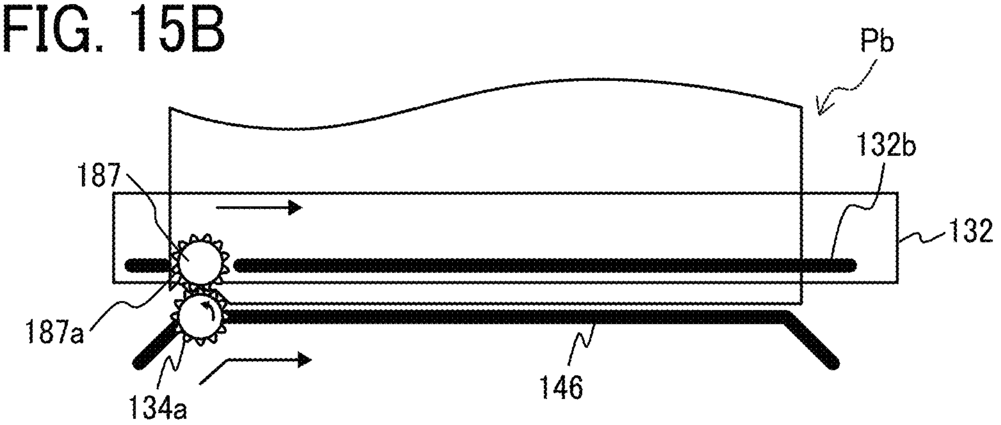
Figure 15C:
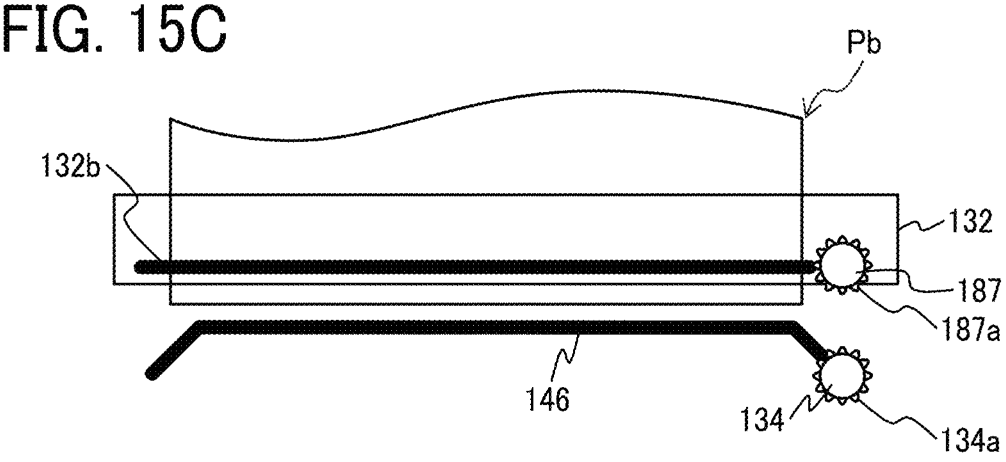

FIGS. 15A to 15C are cross-sectional views of the saddle-stitching unit according to the fourth modification, which illustrate operation of the saddle-stitching unit. FIGS. 15A to 15C are cross-sectional views of the saddle-stitching unit according to the fourth modification viewed from the sheet conveyance direction side at the center line of center folding, that is, at the center position of the thickness of the folding blade 132. FIG. 15A corresponds to the state of FIG. 6C. The folding blade 132 has pushed the sheet bundle Pb to a position beyond the nip position of the folding roller pair 133. The folding-blade engagement roller 134 and the crimp roller 187 are located at the standby position (HP position), and are separated from the sheet bundle Pb in the center-folding ejection direction.

The crimp roller 187 serving as a first roller is supported in such a way as to be guided by a crimp-roller rail 132*b*. The crimp-roller rail 132*b* is disposed in a longitudinal direction (main scanning direction) of the folding blade 132. The crimp roller 187 is scanned in the main scanning direction of the sheet bundle Pb by the crimp-roller movement motor 188 (see FIG. 10).

FIG. 15B corresponds to the state of FIG. 6D. The folding-blade engagement roller 134 serving as a second roller is guided by the engagement-roller guide rail 146, approaches the crimp roller 187, and is pressed against the crimp roller 187 via the sheet bundle Pb. The teeth of the engaging-crimping teeth portion 134*a* of the folding-blade engagement roller and teeth 187*a* provided on a pushing surface of the crimp roller 187 are engaged with each other with the sheet bundle Pb interposed therebetween. When the folding-blade engagement roller 134 is pressurized by the folding-blade-engagement-roller pressurizing member 147, the back portion Cb of the sheet bundle Pb is crimped and bound.

Fifth Modification

Next, a fifth modification of the saddle-stitching unit will be described with reference to FIGS. 16A to 16C. A saddle-stitching unit according to the fifth modification differs from the saddle-stitching unit according to the first embodiment in that the crimping teeth of the folding blade in a protruding-recessed shape are not uniformly disposed in the width direction, but are partially (intermittently) disposed. Note that constituent elements common to the saddle-stitching units according to the present modification and the first embodiment are denoted by the same reference numerals, and detailed description thereof will be omitted.

Figure 16A:
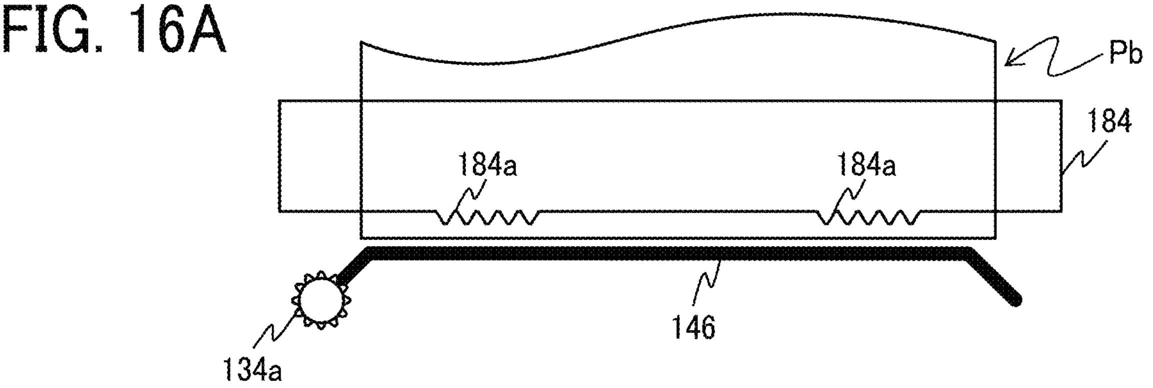
FIGS. 16A to 16C are cross-sectional views of a saddle-stitching unit according to a fifth modification, which illustrate operation of the saddle-stitching unit.
Figure 16B:
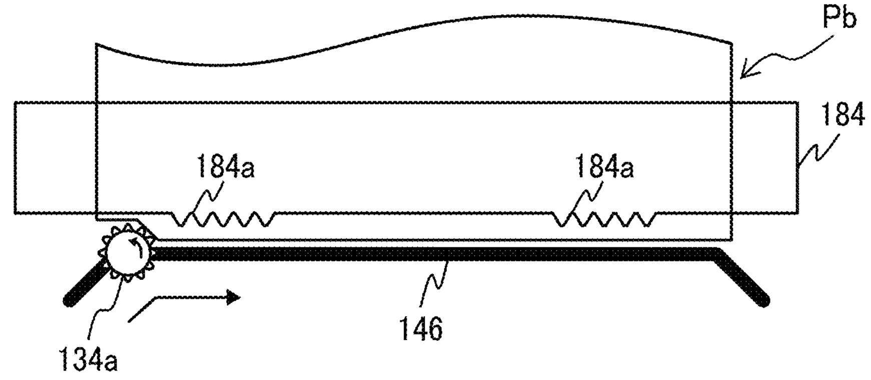
Figure 16C:
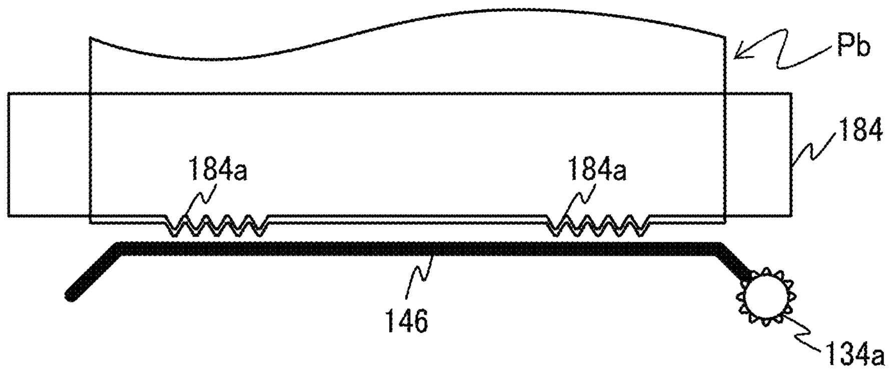

FIGS. 16A to 16C are cross-sectional views of the saddle-stitching unit according to the fifth modification, which illustrate operation of the saddle-stitching unit. FIGS. 16A to 16C are cross-sectional views of the saddle-stitching unit according to the fifth modification viewed from the sheet conveyance direction side at the center line of center folding, that is, at the center position of the thickness of the folding blade 132. FIG. 16A corresponds to the state of FIG. 6C. The folding blade 184 has pushed the sheet bundle Pb to a position beyond the nip position of the folding roller pair 133. The folding-blade engagement roller 134 is located at the standby position (HP position), and is separated from the sheet bundle Pb in the center-folding ejection direction.

FIG. 16B corresponds to the state of FIG. 6D. The folding-blade engagement roller 134 is pressed against the folding blade 132 with the sheet bundle Pb interposed therebetween. Thus, the teeth of the engaging-crimping teeth portion 134*a* of the folding-blade engagement roller 134 and the teeth 184*a* provided on the pushing surface of the folding blade 184 are engaged with each other with the sheet bundle Pb interposed therebetween. When the folding-blade engagement roller 134 is pressurized by the folding-blade-engagement-roller pressurizing member 147, the back portion of the sheet bundle Pb is crimped and bound.

Figure 17:
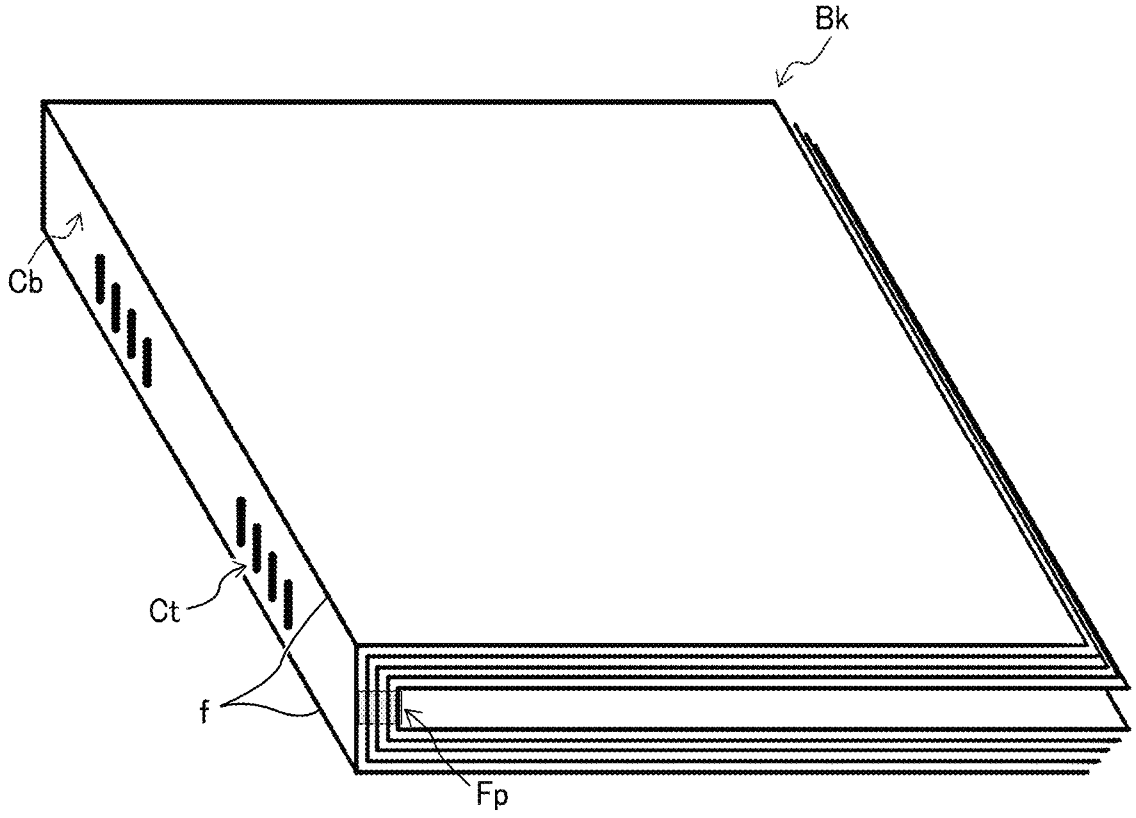
FIG. 17 is a schematic view of a crimp-saddle-stitched booklet bound in the fifth modification.

FIG. 17 is a schematic view of a booklet Bk formed in the fifth modification. As illustrated in FIG. 17, the back portion Cb of the booklet Bk has a square back. Then, the back portion Cb is intermittently crimped and bound, and crimp marks Ct are intermittently formed in the longitudinal direction of the back portion Cb (width direction of the sheet bundle Pb).

Sixth Modification

Figure 18:
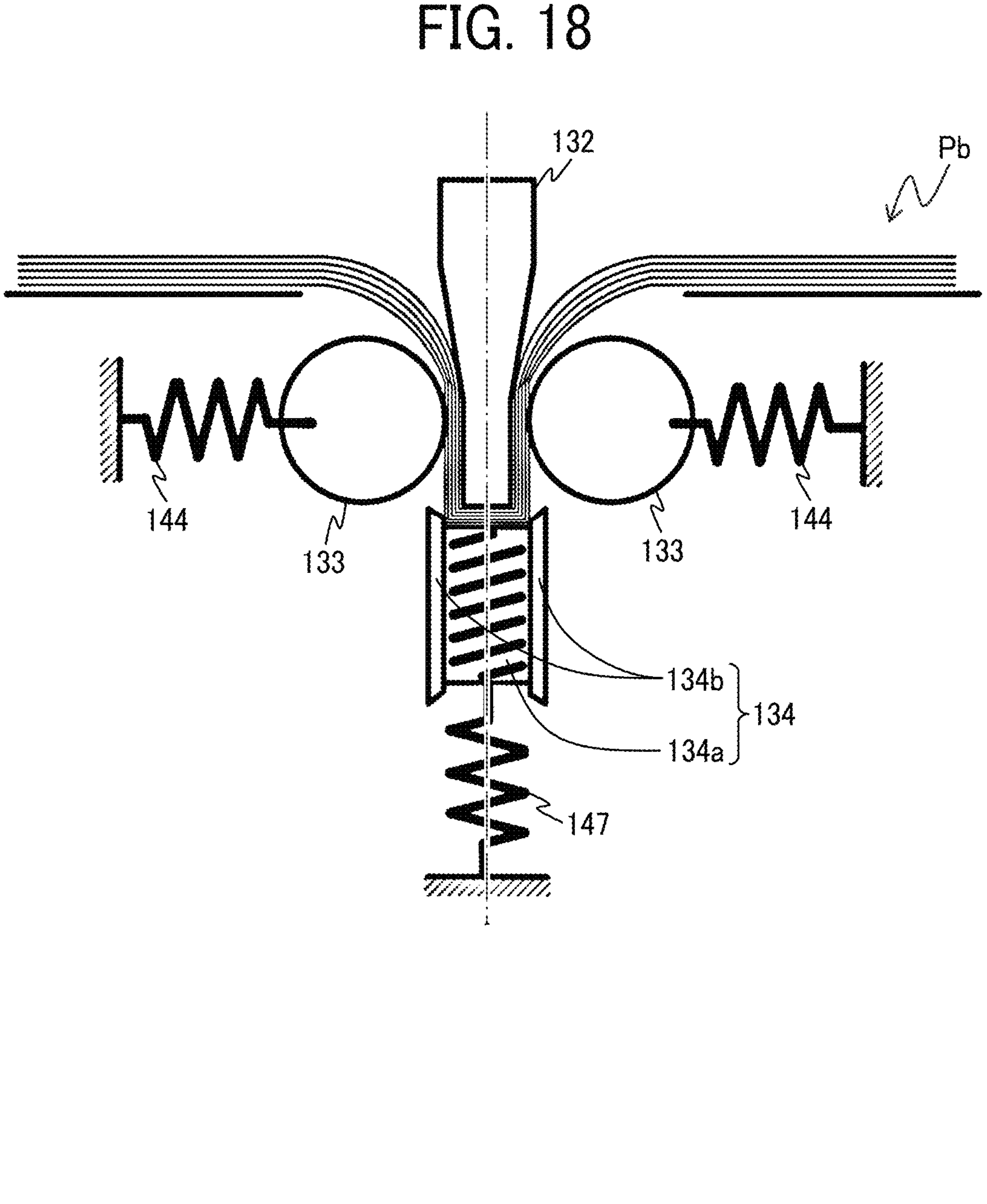
FIG. 18 is a schematic diagram illustrating a sixth modification of the saddle-stitching unit.

Next, a sixth modification of the saddle-stitching unit will be described with reference to FIGS. 18 and 19. A saddle-stitching unit according to the sixth modification differs from the saddle-stitching unit according to the first embodiment in that the teeth of the engaging-crimping teeth portion 134*a* of the folding-blade engagement roller are not arranged perpendicularly in the main scanning direction, but are formed in, for example, a "helical-tooth shape" inclined with respect to the main scanning direction. Here, the teeth of the engaging-crimping teeth portion 134*a* are inclined at an angle of, for example, 15 degrees. Note that constituent elements common to the saddle-stitching units according to the present modification and the first embodiment are denoted by the same reference numerals, and detailed description thereof will be omitted.

Figure 19:
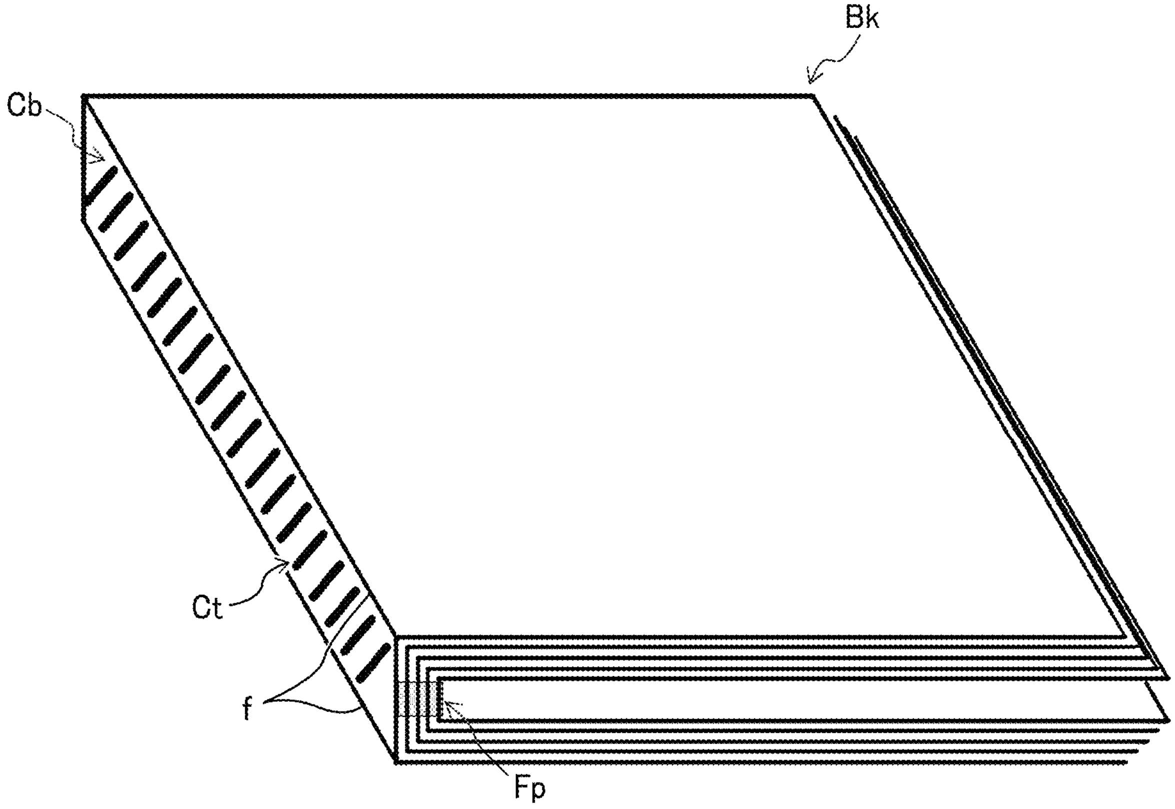
FIG. 19 is a schematic view of a crimp-saddle-stitched booklet bound in the sixth modification.

FIG. 19 is a schematic view of a crimp-saddle-stitched booklet bound in the sixth modification. As illustrated in FIG. 19, the back portion Cb of the booklet Bk has a square back. Then, the back portion Cb is intermittently crimped and bound, and crimp marks Ct inclined in the main scanning direction are intermittently formed in the longitudinal direction of the back portion Cb (width direction of the sheet bundle Pb).

Seventh Modification

Next, a seventh modification of the saddle-stitching unit will be described with reference to FIGS. 20A to 20D. A saddle-stitching unit according to the seventh modification differs from the saddle-stitching unit according to the first embodiment in that the folding-blade engagement roller 134 performs scanning on a figure-eight trajectory. Note that constituent elements common to the saddle-stitching units according to the present modification and the first embodiment are denoted by the same reference numerals, and detailed description thereof will be omitted.

Figure 20A:
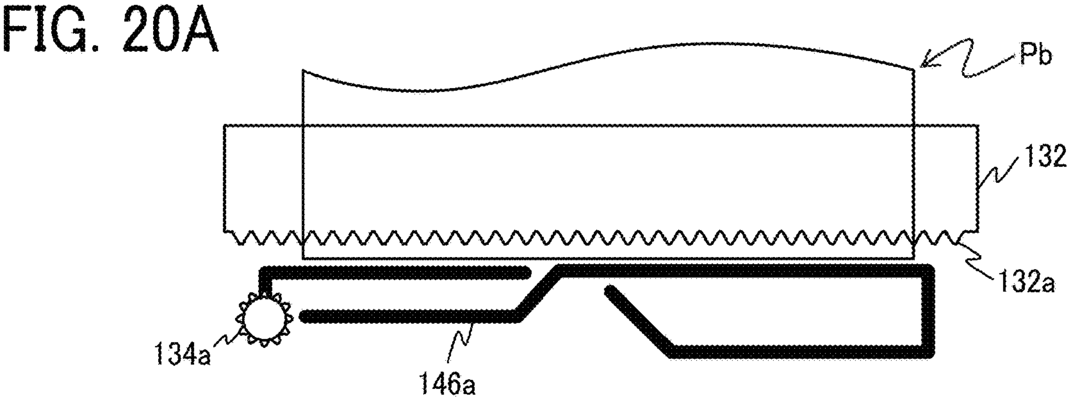
FIGS. 20A to 20D are cross-sectional views of a saddle-stitching unit according to a seventh modification, which illustrate operation of the saddle-stitching unit.

FIGS. 20A to 20D are cross-sectional views of the saddle-stitching unit according to the seventh modification, which illustrate operation of the saddle-stitching unit. FIGS. 20A to 20D are cross-sectional views of the saddle-stitching unit according to the seventh modification viewed from the sheet conveyance direction side at the center line of center folding, that is, at the center position of the thickness of the folding blade 132. FIG. 20A corresponds to the state of FIG. 6C. The folding blade 132 has pushed the sheet bundle Pb to a position beyond the nip position of the folding roller pair 133. The folding-blade engagement roller 134 is located at the standby position (HP position), and is separated from the sheet bundle Pb in the center-folding ejection direction.

Folding-conveyance Direction

The folding-blade engagement roller 134 is supported by an engagement-roller guide rail 146*a*. The folding-blade engagement roller 134 is moved along the engagement-roller guide rail 146*a* by the folding-blade-engagement-roller scanning motor 145 (see FIG. 10). The movement of the folding-blade engagement roller 134 is controlled by the controller 190 (FIG. 10).

The engagement-roller guide rail 146*a* is disposed in such a way as to connect a position where the engaging-crimping teeth portion 134*a* of the folding-blade engagement roller 134 engages with the folding-crimping teeth portion 132*a* of the folding blade 132 and a position where the engaging-crimping teeth portion 134*a* is separated from the folding blade 132. Since the engagement-roller guide rail 146*a* is provided, the folding-blade engagement roller 134 approaches the folding blade 132 in a predetermined section in the longitudinal direction of the folding blade 132, and separates from the folding blade 132 in another section.

Figure 20B:
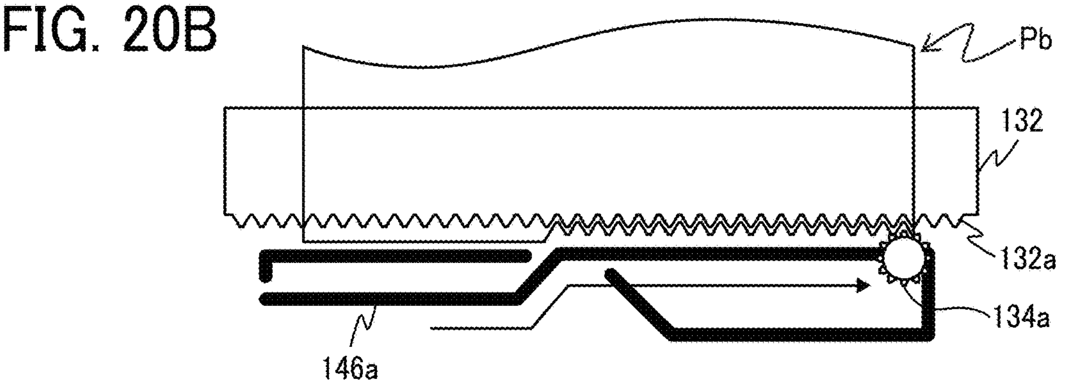

FIG. 20B corresponds to the state of FIG. 6D. The folding-blade engagement roller 134 is guided by the engagement-roller guide rail 146*a* and pressed toward the folding blade 132 with the sheet bundle Pb interposed between the folding-blade engagement roller 134 and the folding blade 132 from a first predetermined position in the width direction of the sheet bundle Pb. At this time, the teeth of the engaging-crimping teeth portion 134*a* of the folding-blade engagement roller and the folding-crimping teeth portion 132*a* provided on the pushing surface of the folding blade 132 are engaged with each other with the sheet bundle Pb interposed therebetween. When the folding-blade engagement roller 134 is pressurized by the folding-blade-engagement-roller pressurizing member 147, the back portion Cb of the sheet bundle Pb is crimped and bound.

As illustrated in FIG. 20B, the folding-blade engagement roller 134 is guided by the engagement-roller guide rail 146*a* to move in the main scanning direction to a retracted position where the folding-blade engagement roller 134 passes through an edge of the sheet bundle, and crimps and binds substantially half of a region of the sheet bundle Pb in the width direction.

Figure 20C:
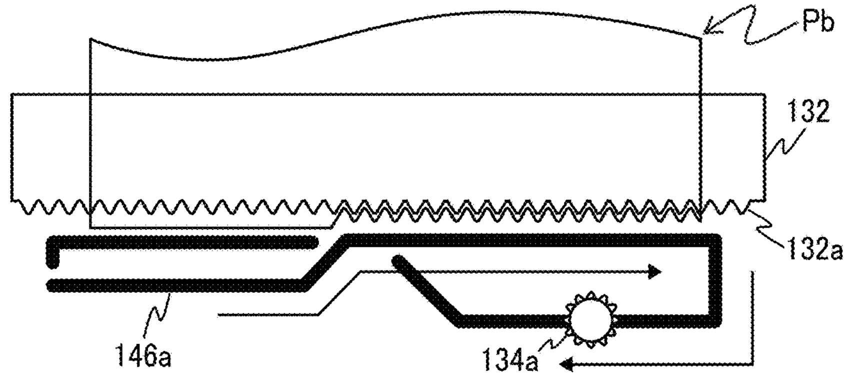

Subsequently, as illustrated in FIG. 20C, the folding-blade engagement roller 134 is guided by the engagement-roller guide rail 146*a*, is separated again from the sheet bundle Pb at the retracted position, and moves in a reverse direction in the main scanning direction.

Figure 20D:
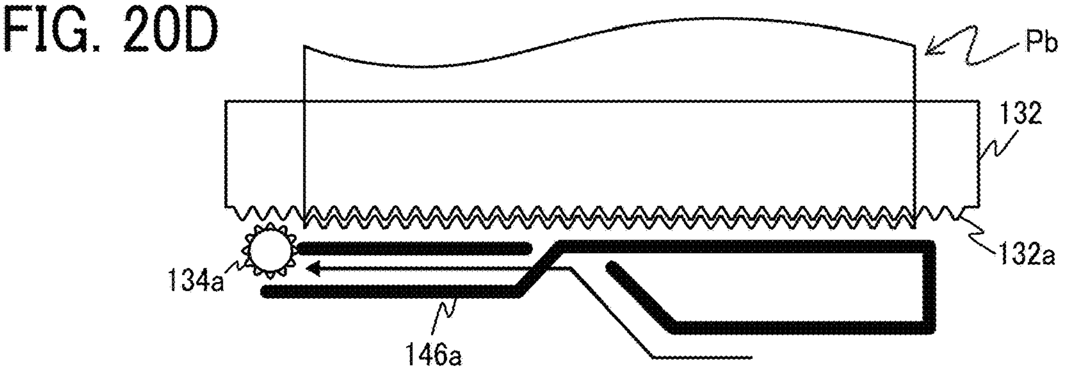

Subsequently, as illustrated in FIG. 20D, the folding-blade engagement roller 134 is guided by the engagement-roller guide rail 146*a*, and moves in the main scanning direction while pressing the sheet bundle Pb again from a second predetermined position until the folding-blade engagement roller 134 passes through the other edge of the sheet bundle Pb.

The folding-blade engagement roller 134 is guided by the engagement-roller guide rail 146*a* and moves along a figure-eight trajectory. Thus, the entire width direction region of the booklet back portion of the sheet bundle Pb is crimped and bound.

The folding-blade engagement roller 134 presses and deforms the back portion Cb of the sheet bundle Pb to perform crimp binding and square-back folding. Since the folding-blade engagement roller 134 sequentially performs the crimp binding and the square-back folding while performing scanning in the main scanning direction, the pressing force can be concentrated on a point of processing. As a result, the pressing force can be reduced, and thus, the apparatus can be downsized. Meanwhile, when unintended deformation (for example, sheet wrinkle) of the sheet bundle occurs, sheet wrinkles are accumulated and enlarged as scanning proceeds in the main scanning direction.

The folding-blade engagement roller 134 moves along the figure-eight trajectory. As a result, it is possible to process a front half region of the sheet width from a central portion toward an edge, first, and then process a back half region from the central portion toward the other edge. Even in a case where unintended deformation (for example, sheet wrinkle) of the sheet bundle occurs, it is possible to reduce accumulation of sheet wrinkles to half.

Eighth Modification

Next, an eighth modification of the saddle-stitching unit will be described with reference to FIG. 21. A saddle-stitching unit according to the eighth modification differs from the saddle-stitching unit according to the first embodiment in that no crimping teeth portion having a protruding-recessed shape is provided on the pressing surface of the folding blade 132, no constituent element such as the folding-crimping teeth portion 132*a* serving as a folding-crimping teeth portion having a protruding-recessed shape is provided on the cylindrical outer peripheral portion of the folding-blade engagement roller, and instead, a reheating unit is provided on the cylindrical outer peripheral portion of a folding-blade engagement roller 191. Note that constituent elements common to the saddle-stitching units according to the present modification and the first embodiment are denoted by the same reference numerals, and detailed description thereof will be omitted.

Figure 21:
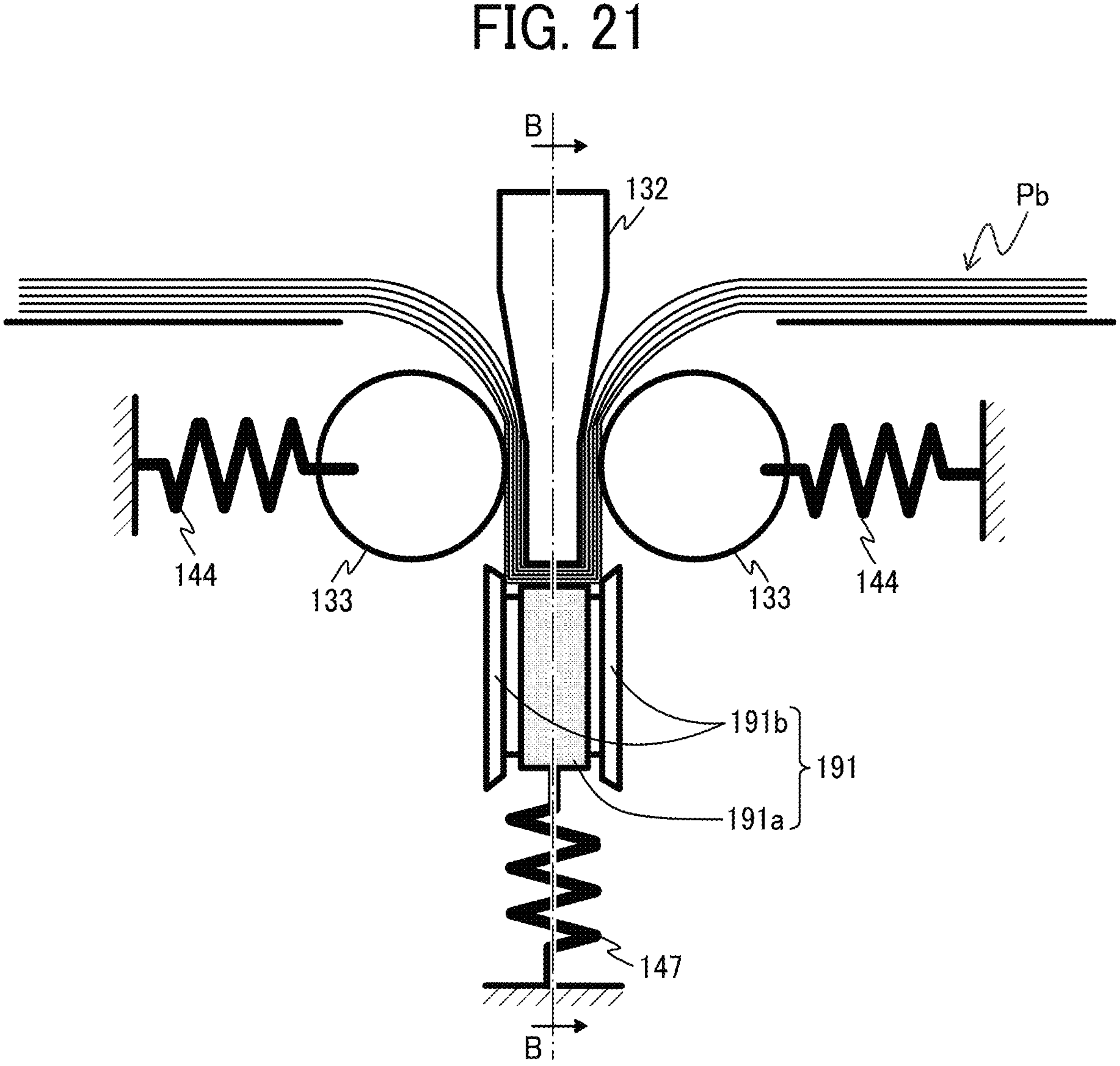
FIG. 21 is a schematic diagram illustrating an eighth modification of the saddle-stitching unit.

FIG. 21 is a schematic diagram illustrating the eighth modification of the saddle-stitching unit. The folding roller pair 133 is pressed against each other by the folding-roller-pair pressurizing member 144 while nipping the folding blade 132 and the sheet bundle Pb.

Furthermore, the folding-blade engagement roller 191 serving as a folding-plate-engagement heater according to the present modification is pressed by the folding-blade-engagement-roller pressurizing member 147 toward the folding blade 132 with the sheet bundle Pb interposed between the folding-blade engagement roller 191 and the folding blade 132. By use of the pressing force and the heat, toner-crimp binding is performed by a heat-crimping portion 191*a* of the folding-blade engagement roller 191. Then, the back-portion forming process of performing square-back folding on the sheet bundle Pb can be performed by flange portions 191*b* formed at both ends of a cylindrical portion of the folding-blade engagement roller 191.

The folding-blade engagement roller 191 forming a toner-crimp binder is a cylindrical roller-shaped member. A rotation axis of the folding-blade engagement roller 191 is set in a direction passing through both ends sandwiching the cylindrical outer peripheral portion of the folding-blade engagement roller 191. The folding-blade engagement roller 191 is pivotally supported such that the folding-blade engagement roller 191 can rotate about the rotation axis as a rotation center. The folding-blade engagement roller 191 includes the heat-crimping portion 191*a* on the cylindrical outer peripheral portion (cylindrical outer peripheral surface). The folding-blade engagement roller 191 also includes the flange portions 191*b* having an outer diameter larger than the outer diameter of the heat-crimping portion 191*a* at both ends of the cylindrical outer peripheral surface. The flange portions 191*b* are equal in diameter at both ends of the cylindrical outer peripheral surface.

The heat-crimping portion 191*a* of the folding-blade engagement roller 191 is a portion heated by a heater installed inside the folding-blade engagement roller 191.

Figure 22A:
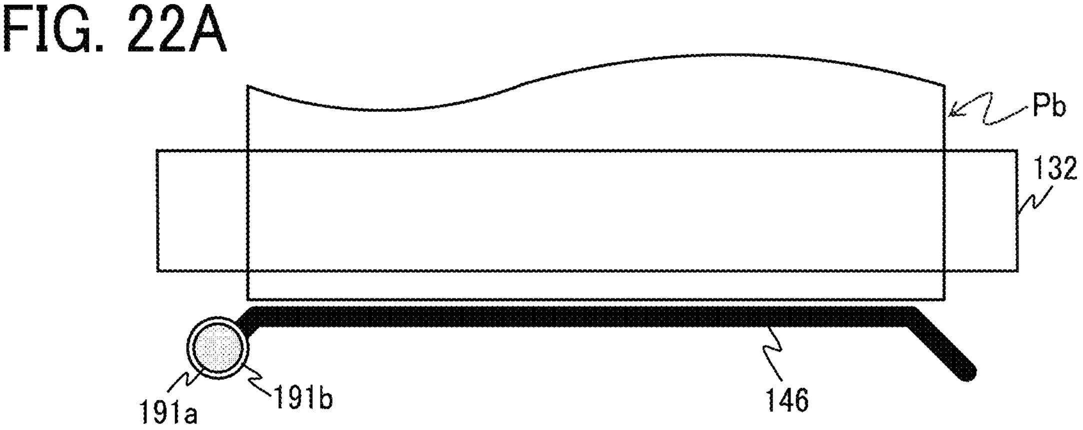
FIGS. 22A to 22C are cross-sectional views of a saddle-stitching unit according to the eighth modification, which illustrate operation of the saddle-stitching unit.
Figure 22B:
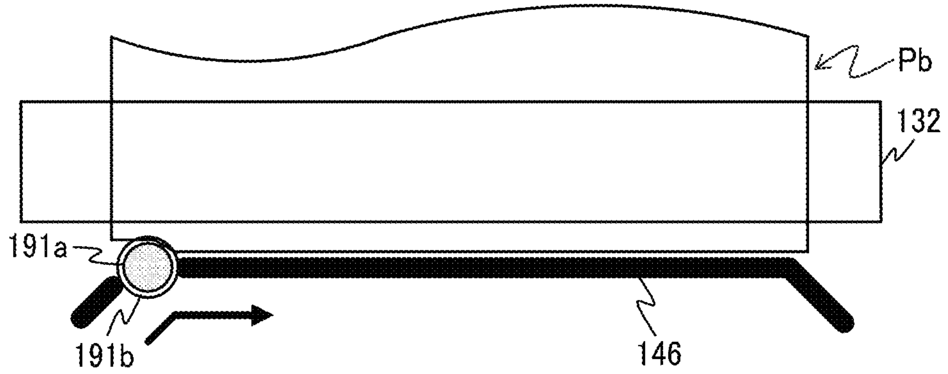
Figure 22C:
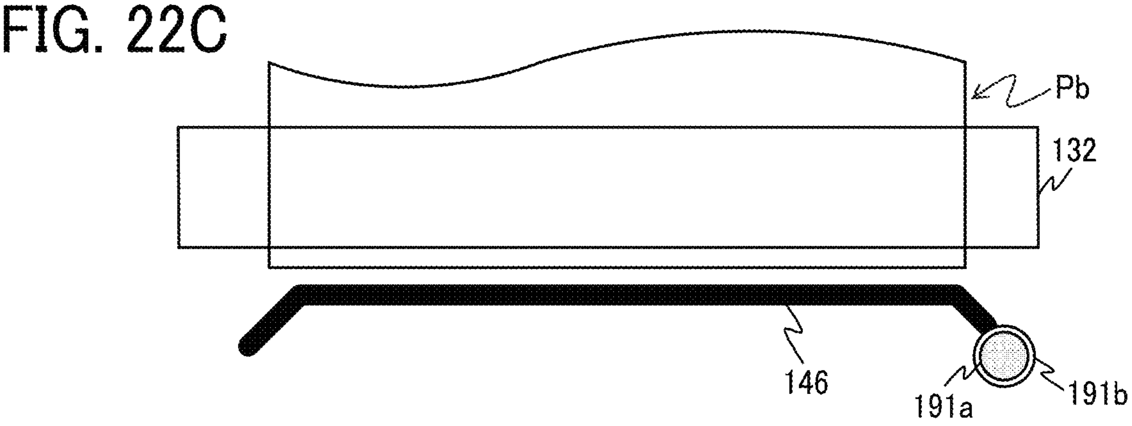

FIGS. 22A to 22C are cross-sectional views of the saddle-stitching unit according to the eighth modification, which illustrate operation of the saddle-stitching unit. FIGS. 22A to 22C are cross-sectional views of the saddle-stitching unit taken along line B-B in FIG. 21, as viewed from the sheet conveyance direction side at the center line of center folding, that is, at the center position of the thickness of the folding blade 132. FIG. 22A corresponds to the state of FIG. 6C. The folding blade 132 has pushed the sheet bundle Pb to a position beyond the nip position of the folding roller pair 133. The folding-blade engagement roller 191 is located at the standby position (HP position), and is separated from the sheet bundle Pb in the center-folding ejection direction.

The folding-blade engagement roller 191 (heat-crimping portion 191*a*) is moved in the main scanning direction (width direction) by the folding-blade-engagement-roller scanning motor 145 (see FIG. 10). The saddle-stitching unit is provided with the engagement-roller guide rail 146 as a folding-blade-engagement-roller contacting/separating mechanism. The folding-blade engagement roller 191 moves in the main scanning direction along the engagement-roller guide rail 146.

FIG. 22B corresponds to the state of FIG. 6D. The folding-blade engagement roller 191 is pressed against the folding blade 132 with the sheet bundle Pb interposed therebetween, and the heat-crimping portion 191*a* of the folding-blade engagement roller is pressed against the pushing surface of the folding blade 132 to be heated and pressurized with the sheet bundle Pb interposed therebetween. As a result, the back portion Cb of the sheet bundle Pb is crimped and bound.

FIG. 22C illustrates a state in which the entire region of the back portion Cb of the sheet bundle Pb in the longitudinal direction is crimped and bound, and then the folding-blade engagement roller 191 is separated from the sheet bundle Pb in the center-folding ejection direction.

Figure 23A:
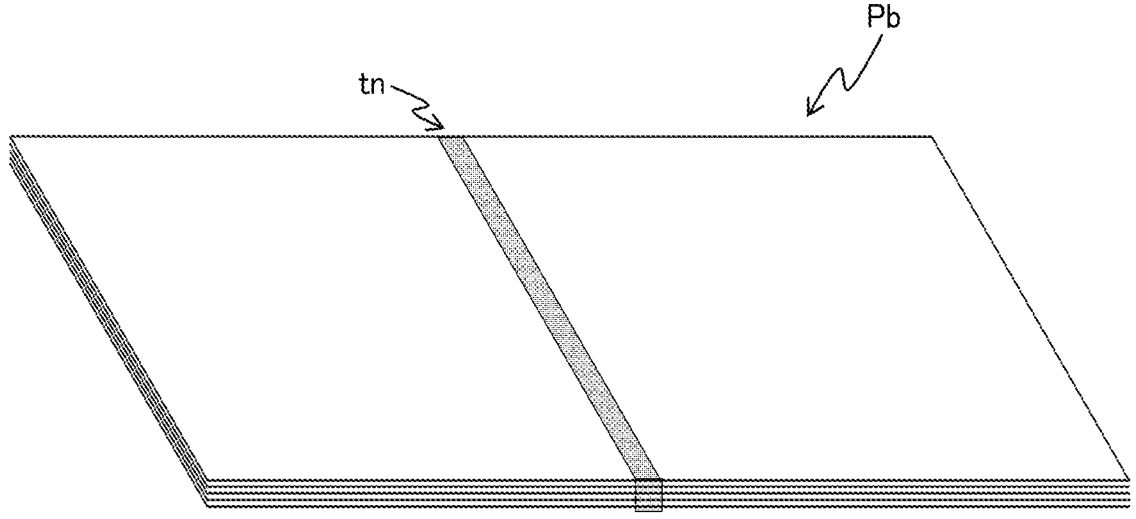
FIGS. 23A and 23B are schematic views of a crimp-saddle-stitched booklet bound in the eighth modification.

FIG. 23A is a schematic view of the sheet bundle Pb that has yet to be subjected to center folding and crimp binding in the eighth modification. FIG. 23A corresponds to the state of FIG. 6A. As illustrated in FIG. 23A, a toner image "tn" is formed at a position corresponding to a fold portion of the booklet Bk by the image forming apparatus 101 using toner for forming a visible image, for adhesion. The toner image corresponds to an adhesive medium formed on an adhesive portion of the sheet bundle Pb. Note that a detailed method for forming the toner image "tn" for adhesion by the image forming apparatus 101 is a known technique as disclosed in, for example, Japanese Unexamined Patent Application Publication No. 2004-209858.

Figure 23B:
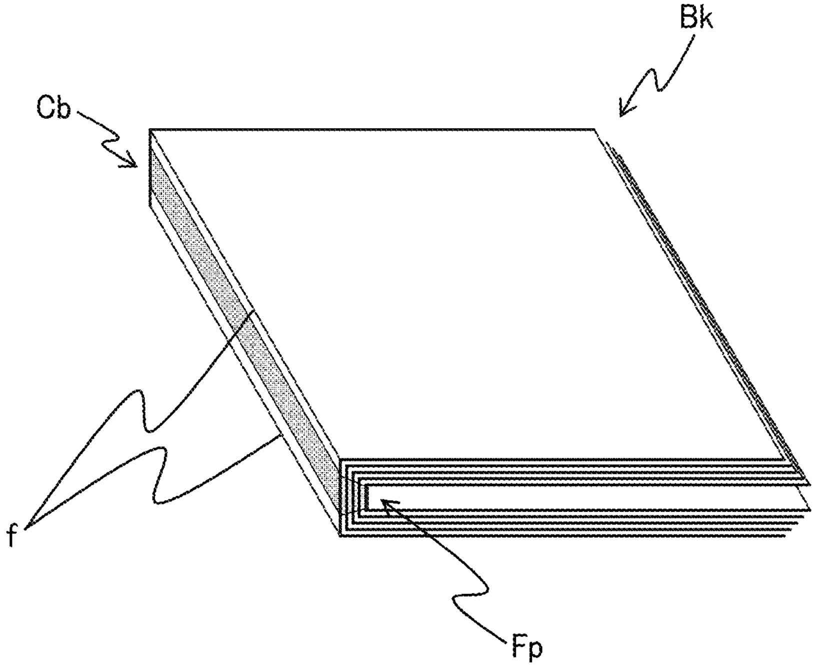

FIG. 23B is a schematic view of the booklet Bk formed by center folding and crimp binding in the eighth modification. As illustrated in FIG. 23B, the back portion Cb of the booklet Bk has a square back. Then, the toner image "tn" for adhesion is reheated on the back portion Cb. As a result, the toner image "tn" on an overlapping portion of multiple sheets P forming a flat portion (back portion Cb) of a square back exerts adhesive force to perform toner crimp binding.

Ninth Modification

Next, a ninth modification of the saddle-stitching unit will be described with reference to FIGS. 24A and 24B. A saddle-stitching unit according to the ninth modification differs from the saddle-stitching unit according to the eighth modification in that the folding-blade engagement member includes a folding-blade engagement die 192 as a blade member extending in the width direction, instead of a roller member that performs scanning (rotationally moves). Note that constituent elements common to the saddle-stitching units according to the present modification and the first embodiment are denoted by the same reference numerals, and detailed description thereof will be omitted.

Figure 24A:
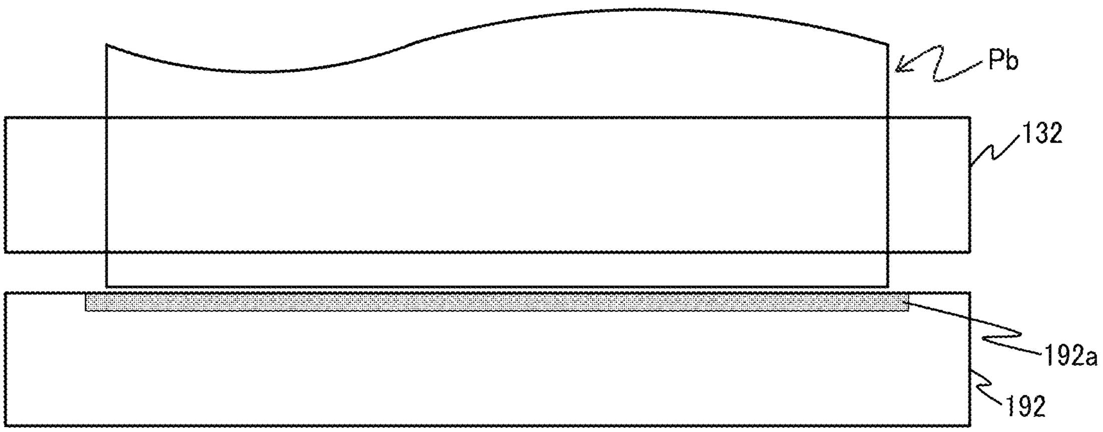
FIGS. 24A and 24B are cross-sectional views of a saddle-stitching unit according to a ninth modification, which illustrate operation of the saddle-stitching unit.
Figure 24B:
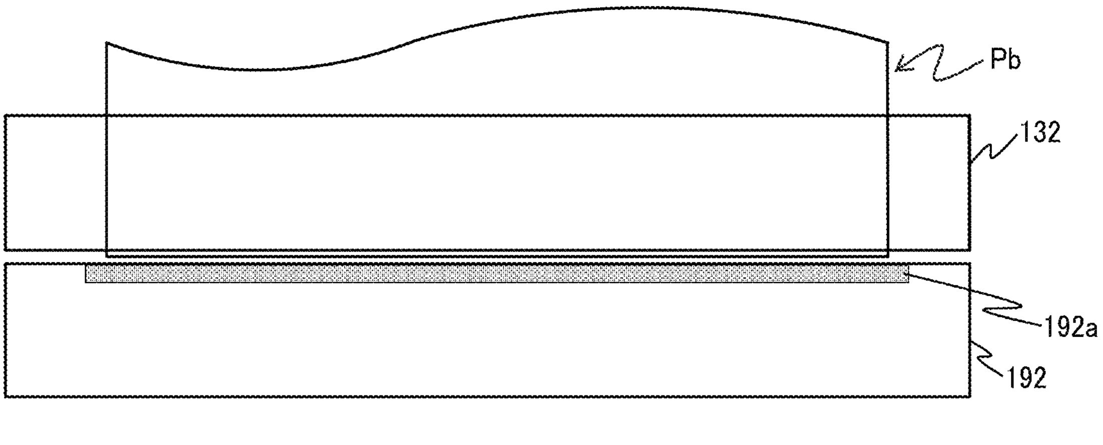

FIGS. 24A and 24B are cross-sectional views of the saddle-stitching unit according to the ninth modification, which illustrate operation of the saddle-stitching unit. FIGS. 24A and 24B are cross-sectional views of the saddle-stitching unit taken along line B-B as viewed from the sheet conveyance direction side at the center line of center folding, that is, at the center position of the thickness of the folding blade 132. FIG. 24A corresponds to the state of FIG. 6C. The folding blade 132 has pushed the sheet bundle Pb to a position beyond the nip position of the folding roller pair 133. The folding-blade engagement die 192 is located at the standby position (HP position), and is separated from the sheet bundle Pb in the center-folding ejection direction.

The folding-blade engagement die 192 is moved toward the folding blade by the folding-blade-engagement-die movement motor 182.

FIG. 24B corresponds to the state of FIG. 6D. The folding-blade engagement die 192 is pressed against the folding blade 132 with the sheet bundle Pb interposed therebetween, and a heat-crimping portion 192*a* of the folding-blade engagement roller is pressed against the pushing surface of the folding blade 132 to heat and pressurize the sheet bundle Pb interposed therebetween. As a result, the back portion of the sheet bundle Pb is crimped and bound.

Second Embodiment

Figure 25:
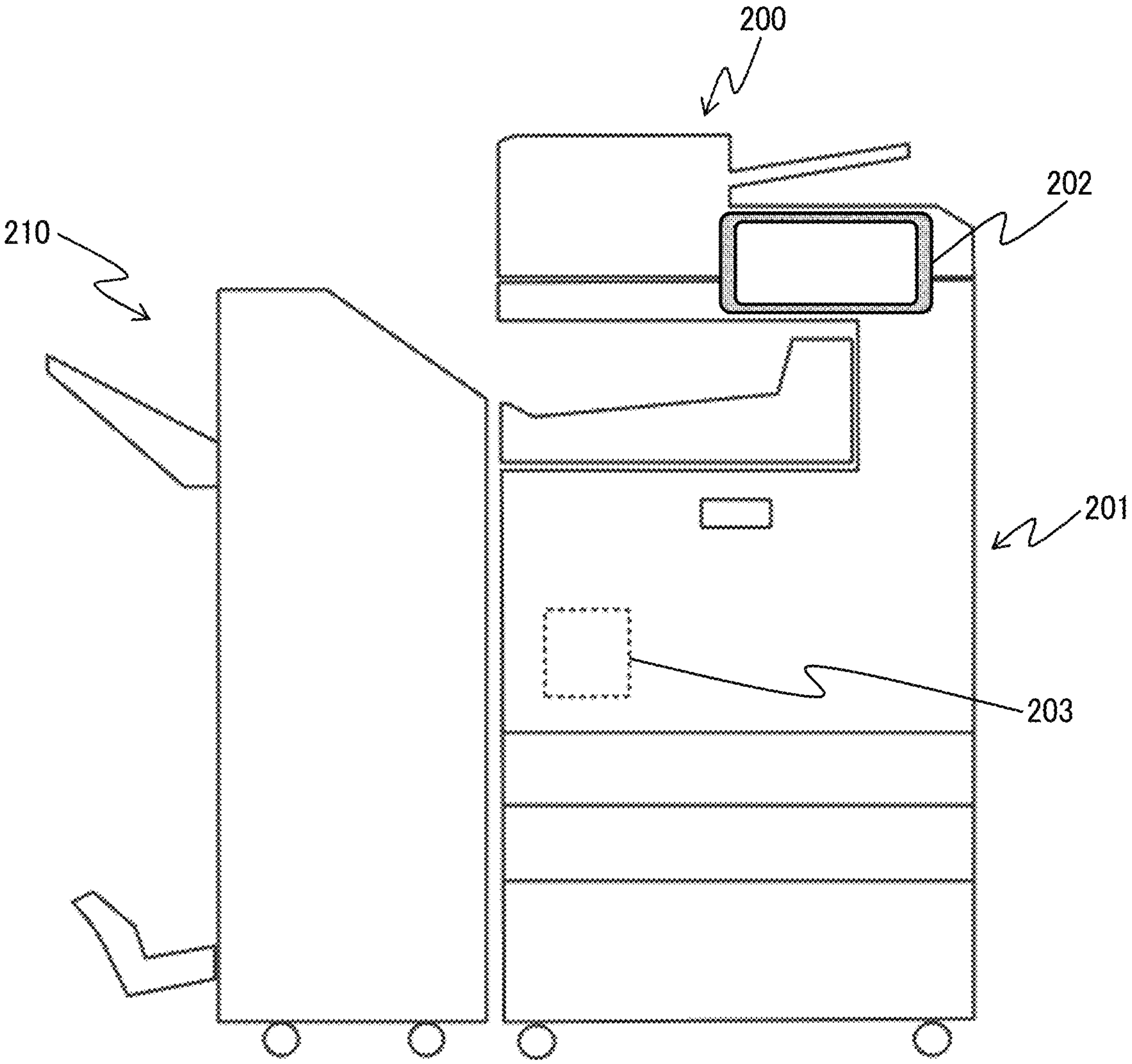
FIG. 25 is a diagram illustrating an overall configuration of an image forming system according to a second embodiment.

Next, a second embodiment of the image forming system according to the present disclosure will be described. FIG. 25 is a diagram illustrating an overall configuration of a multifunction printer (MFP) 200 as the second embodiment of the image forming system. The MFP 200 has a function of forming an image on a sheet P (medium) and performing post-processing on the sheet P on which the image has been formed. As illustrated in FIG. 25, the MFP 200 includes an image forming apparatus 201 and a post-processing apparatus 210. The post-processing apparatus 210 is a console-type apparatus disposed adjacent to the image forming apparatus.

The image forming apparatus 201 forms an image on the sheet P, and ejects the sheet P on which the image has been formed to the post-processing apparatus 210. The image forming apparatus 201 includes a tray, a conveyor, and an image former. Sheets P are stored in the tray. The conveyor conveys a sheet P stored in the tray. The image former forms an image on the sheet P conveyed by the conveyor. The image former may be an inkjet image forming device that forms an image with ink or an electrophotographic image forming device that forms an image with toner. Since the configuration of the image forming apparatus 201 is already known, detailed description thereof will be omitted.

Figure 26:
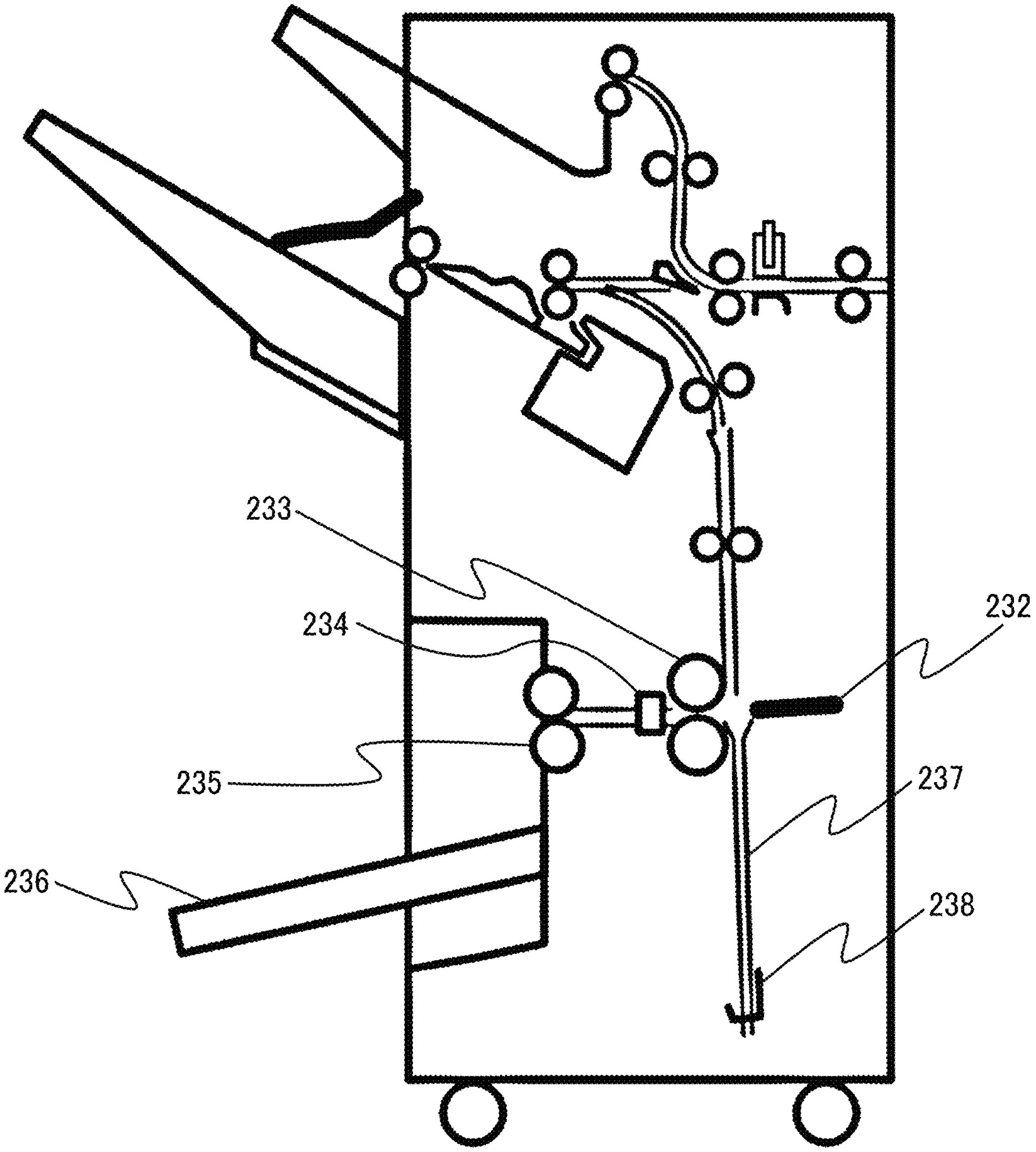
FIG. 26 is a diagram illustrating an internal structure of a post-processing apparatus according to the second embodiment.

FIG. 26 is a diagram illustrating an internal structure of the post-processing apparatus 210 according to the second embodiment. The post-processing apparatus 210 performs post-processing on the sheet P on which an image has been formed by the image forming apparatus 201. The post-processing according to the present embodiment is binding as a process to bind the sheets P on each of which an image has been formed as a bundle of sheets P. In the following description, the bundle of sheets P may be referred to as a "sheet bundle Pb." More specifically, the binding according to the present embodiment includes so-called "crimp binding" and "stapling." The crimp binding is a process to press and deform the sheet bundle Pb at a crimp binding position. The stapling is a process to bind the sheet bundle Pb with a staple. The crimp binding includes edge stitching and saddle stitching. The edge stitching is a process to bind an edge of the sheet bundle Pb. The saddle stitching is a process to bind the center of the sheet bundle Pb.

Constituent elements common to the saddle-stitching units according to the present embodiment and the first embodiment are denoted by the same reference numerals, and detailed description thereof will be omitted.

Saddle Stitching

As illustrated in FIG. 26, the post-processing apparatus 210 includes a folding blade 232, a folding roller pair 233, a folding-blade engagement roller 234, a center-folded booklet ejection roller pair 235, and a center-folded booklet ejection tray 236.

The conveyance rollers place sheets P on a saddle-stitching inner tray 237, and switchback-convey the sheets P on the saddle-stitching inner tray 237 toward a movable end fence 238.

Multiple sheets P conveyed in sequence is temporarily placed on the saddle-stitching inner tray 237. The movable end fence 238 is movable in a conveyance direction of the sheets P along the saddle-stitching inner tray 237. The movable end fence 238 aligns the sheets P such that the folding blade 232 faces a central position of a sheet conveyance direction length according to a sheet size. The side fence aligns the sheets P or the sheet bundle Pb placed on the saddle-stitching inner tray 237 in a main scanning direction (width direction). A saddle-stitching unit performs saddle stitching on the sheet bundle Pb aligned by the movable end fence 238 and the side fence. The sheet bundle Pb subjected to saddle stitching is ejected by the center-folded booklet ejection roller pair 235, and is placed on the center-folded booklet ejection tray 236.

As described above, according to the embodiments of the sheet processing apparatus according to the present disclosure, application of the crimp-binding technique makes it possible to perform saddle stitching while performing a center-folding process and a square-folding process without using metal staple members or adhesive. The saddle stitching can be performed by crimp-saddle stitching. More specifically, multiple sheet-like media can be stacked and folded to obtain a booklet-like sheet bundle. As a process of obtaining the sheet bundle, it is possible to perform saddle stitching while performing a center-folding process and a square-folding process. It is possible to form a back portion of the booklet-like sheet bundle by performing crimp binding while performing square-folding process.

The functionality of the elements disclosed herein such as the controller 190 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure are not limited to the above-described embodiments and modifications, and numerous additional modifications and variations are possible in light of the teachings. The technical contents included in the technical ideas described in the appended claims are included within the technical scope of the appended claims. The above-described embodiments and modifications are some examples, and various modifications and variations can be practiced from such examples by those skilled in the art. Such modifications and variations are included in the technical scope described in the appended claims.

Aspects of the present disclosure are, for example, as follows.

First Aspect

According to a first aspect, a sheet processing apparatus includes: a center-folder that performs a center-folding process on a sheet bundle including multiple sheet materials; a back-crimp binder that forms a back portion on the sheet bundle subjected to the center-folding process and performs a crimp-binding process; and a controller that controls the center-folding process and the crimp-binding process, in which the controller causes the back-crimp binder to perform the crimp-binding process on the back portion while forming the back portion in the crimp-binding process.

Second Aspect

According to a second aspect, in the sheet processing apparatus of the first aspect, the center-folder includes: a folding plate that guides a part of the sheet bundle in a predetermined direction; a folding-roller pair that nips the sheet bundle guided by the folding plate and advances the sheet bundle in the predetermined direction; and a pressure mechanism that pressurizes the folding-roller pair toward a nip position, and when the folding plate advances the part of the sheet bundle toward the nip position of the folding-roller pair, the controller sets a position of the folding-roller pair to a receiving position that is a position where the nip position is separated according to a separation amount that is a predetermined amount.

Third Aspect

According to a third aspect, in the sheet processing apparatus of the second aspect, with regard to setting of the receiving position, the controller adjusts the separation amount based on at least one of a number of the sheet materials to be included in the sheet bundle, a type of each sheet material, and a thickness of each sheet material.

Fourth Aspect

According to a fourth aspect, in the sheet processing apparatus of the second aspect or the third aspect, the controller causes the folding plate to advance to a position beyond the nip position with respect to the folding-roller pair.

Fifth Aspect

According to a fifth aspect, in the sheet processing apparatus of the second aspect or the third aspect, before the center-folding process is started, the controller sets the position of the folding-roller pair to a standby position where the folding-roller pair is separated from each other further than in the receiving position.

Sixth Aspect

According to a sixth aspect, in the sheet processing apparatus of the second aspect or the fifth aspect, the pressure mechanism includes a biasing member that biases rollers toward the nip position in directions in which the rollers face each other, the rollers being included in the folding-roller pair, and when the folding plate passes through the nip position, the folding-roller pair in the receiving position is pushed outward in such a way as to be moved away from each other.

Seventh Aspect

According to a seventh aspect, in the sheet processing apparatus of the second aspect or the third aspect, the controller causes the folding-roller pair to rotate in accordance with a traveling speed of the folding plate.

Eighth Aspect

According to an eighth aspect, in the sheet processing apparatus of the second aspect or the third aspect, the back-crimp binder includes a folding-plate engagement member that engages with the folding plate via the sheet materials, and the controller places the folding plate engagement member in a retracted position or an engagement position, the folding-plate engagement member in the retracted position being separated from the folding plate, the sheet bundle being nipped between the folding-plate engagement member in the engagement position and the folding plate.

Ninth Aspect

According to a ninth aspect, in the sheet processing apparatus of the eighth aspect, the folding-plate engagement member is a roller-shaped member that is pivotally supported, and the controller causes the roller-shaped member to reciprocally move in a main scanning direction of the sheet bundle while maintaining the roller-shaped member in the engagement position.

Tenth Aspect

According to a tenth aspect, in the sheet processing apparatus of the ninth aspect, the controller places the roller-shaped member on an outer side of an edge of the sheet bundle in the main scanning direction before the crimp-binding process and after the crimp-binding process.

Eleventh Aspect

According to an eleventh aspect, in the sheet processing apparatus of the ninth aspect, while the roller-shaped member is moving in the main scanning direction, the controller maintains a pressurized state established by the folding-roller pair.

Twelfth Aspect

According to a twelfth aspect, in the sheet processing apparatus of the ninth aspect, in a case where multiple sheet bundles is formed, the controller causes the roller-shaped member to move forward in the main scanning direction for an odd-numbered sheet bundle, and causes the roller-shaped member to move backward in the main scanning direction for an even-numbered sheet bundle.

Thirteenth Aspect

According to a thirteenth aspect, in the sheet processing apparatus of the eighth aspect or the ninth aspect, the folding-plate engagement member is movable in a folding-conveyance direction that is a traveling direction in which the sheet bundle moves toward the nip position, is in a separated state in the folding-conveyance direction until the folding-plate engagement member moves beyond an edge of the sheet bundle from the retracted position, and establishes a pressed state in a conveyance direction of the sheet bundle and performs scanning in a main scanning direction after moving beyond the edge of the sheet bundle.

Fourteenth Aspect

According to a fourteenth aspect, in the sheet processing apparatus of the eighth aspect or the ninth aspect, the folding-plate engagement member is movable in a folding-conveyance direction that is a traveling direction in which the sheet bundle moves toward the nip position, is in a separated state in the folding-conveyance direction while moving from the retracted position to a first predetermined position in a main scanning direction of the sheet bundle, establishes a pressed state in a conveyance direction of the sheet bundle and performs scanning in the main scanning direction from the first predetermined position, is in a separated state in the folding-conveyance direction while moving from another retracted position to a second predetermined position in the main scanning direction of the sheet bundle, and establishes a pressed state in the conveyance direction of the sheet bundle and performs scanning in the main scanning direction from the second predetermined position.

Fifteenth Aspect

According to a fifteenth aspect, in the sheet processing apparatus of the eighth aspect or the ninth aspect, a folding-crimping teeth having multiple protrusions and recesses is formed on a sheet-material pressing surface of the folding plate in a traveling direction with respect to the folding-roller pair, engaging-crimping teeth having a protruding-recessed shape is formed on the folding-plate engagement member, the engaging-crimping teeth being configured to engage with the folding-crimping teeth, and the controller moves the folding plate toward the folding-plate engagement member and causes the folding-crimping teeth to engage with the engaging-crimping teeth with the sheet bundle interposed therebetween to perform the crimp-binding process on the back portion.

Sixteenth Aspect

According to a sixteenth aspect, in the sheet processing apparatus of the eighth aspect or the ninth aspect, the folding-plate engagement member is a plate-shaped blade facing the folding plate, and the controller moves the blade member toward the folding plate.

Seventeenth Aspect

According to a seventeenth aspect, in the sheet processing apparatus of the eighth aspect, the back-crimp binder includes: a first roller having teeth; and a second roller that engages with the first roller via the sheet bundle, and the controller moves the first roller and the second roller in a main scanning direction of the sheet bundle.

Eighteenth Aspect

According to an eighteenth aspect, an image forming system includes: an image forming apparatus; and the sheet processing apparatus of any one of the first to seventeenth aspects in a body of the image forming apparatus.

Nineteenth Aspect

According to a nineteenth aspect, an image forming system includes: an image forming apparatus; and a sheet processing apparatus that performs predetermined processing on a sheet material on which an image has been formed in the image forming apparatus, the sheet processing apparatus being connected to the image forming apparatus, in which the sheet processing apparatus is the sheet processing apparatus of any one of the first to seventeenth aspects.

Twentieth Aspect

According to a twentieth aspect, a sheet processing method is executable in a sheet processing apparatus, the sheet processing apparatus including: a center-folder that performs a center-folding process on a sheet bundle including multiple sheet materials; a back-crimp binder that forms a back portion on the sheet bundle subjected to the center-folding process and performs a crimp-binding process; and a controller that controls the center-folding process and the crimp-binding process, the sheet processing method causing the controller to execute: a step of performing the center-folding process; and a step of performing the crimp-binding process on a back portion while forming the back portion on a fold portion of the sheet bundle, the fold portion being formed in the center-folding process.

Twenty-First Aspect

According to a twenty-first aspect, in the sheet processing apparatus of the second aspect, the back-crimp binder includes: the folding plate; and a folding-plate-engagement heater that presses the sheet bundle toward the folding plate, the folding-plate-engagement heater including a heater that heats the sheet bundle, and the folding-plate-engagement heater heats an adhesive medium formed at an adhesive portion of the sheet bundle.

Twenty-Second Aspect

According to a twenty-second aspect, in the sheet processing apparatus of the twenty-first aspect, the adhesive medium is a toner that forms a visible image.

Twenty-Third Aspect

According to a twenty-third aspect, in the sheet processing apparatus of the twenty-first aspect, the folding-plate-engagement heater is a roller-shaped member that is pivotally supported, and reciprocally moves in a longitudinal direction of the back portion to perform a back-portion forming process and the crimp-binding process, the back portion being formed in the back-portion forming process.

Twenty-Fourth Aspect

According to a twenty-fourth aspect, in the sheet processing apparatus of the twenty-first aspect, the folding-plate-engagement heater is a plate-shaped blade facing the folding plate, and moves the blade member toward the folding plate to perform the crimp-binding process.

Twenty-Fifth Aspect

According to a twenty-fifth aspect, an image forming system includes: an image forming apparatus; and a sheet processing apparatus that performs predetermined processing on a sheet material on which an image has been formed in the image forming apparatus, in which the adhesive medium is formed by the image forming apparatus, and the sheet processing apparatus is the sheet processing apparatus of any one of the twenty-first to twenty-fourth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A sheet processing apparatus comprising:
a center-folder to perform a center-folding process on a sheet bundle including multiple sheet materials, wherein the center-folder includes:
a folding plate to guide a part of the sheet bundle in a first direction;
a folding-roller pair to:
nip the sheet bundle guided by the folding plate at a nip position; and
advance the sheet bundle in the first direction; and
a pressure mechanism to pressurize the folding-roller pair toward the nip position in a second direction intersecting the first direction;
a back-crimp binder to:
form a back portion on the sheet bundle subjected to the center-folding process; and
perform a crimp-binding process on the back portion; and
a controller configured to:
cause the center-folder to perform the center-folding process; and
responsive to completion of the center-folding process, cause the back-crimp binder to perform the crimp-binding process on the back portion while forming the back portion on the sheet bundle in the crimp-binding process,
wherein the back-crimp binder includes a folding-plate engagement member to engage with the folding plate via the sheet bundle, and
the controller moves the folding-plate engagement member between: a retracted position at which the folding-plate engagement member is separated from the folding plate and an engagement position at which the sheet bundle is nipped between the folding plate and the folding-plate engagement member.

2. The sheet processing apparatus according to claim 1, wherein the controller is further configured to:
set the folding-roller pair at a receiving position at which the folding-roller pair is separated for a separation amount in the second direction; and
cause the folding plate to advance, in the first direction, the part of the sheet bundle toward the nip position at which the folding-roller pair are at the receiving position and separated for the separation amount.

3. The sheet processing apparatus according to claim 2, wherein the controller causes the folding plate to advance the sheet bundle to a position beyond the nip position with respect to the folding-roller pair.

4. The sheet processing apparatus according to claim 1, wherein the folding-plate engagement member includes a roller rotatable about an axis extended in the second direction, and
the controller causes the roller to reciprocally moves in a main scanning direction intersecting the first direction and the second direction while maintaining the roller in the engagement position.

5. The sheet processing apparatus according to claim 1, wherein the folding-plate engagement member is movable in the first direction to move the sheet bundle toward the nip position,
the folding-plate engagement member is separated from the folding plate in the first direction when the folding-plate engagement member is outside an edge of the sheet bundle in a main scanning direction, intersecting the first direction and the second direction, at the retracted position, and
the folding-plate engagement member presses the sheet bundle against the folding plate in the first direction and reciprocally moves in the main scanning direction after the folding-plate engagement member passes the edge of the sheet bundle in the main scanning direction from the retracted position.

6. The sheet processing apparatus according to claim 1, wherein the folding-plate engagement member is movable in the first direction toward the nip position,
the folding-plate engagement member is separated from the folding plate until the folding-plate engagement member moves from the retracted position to a first position in a main scanning direction intersecting the first direction and the second direction,
the folding-plate engagement member presses the sheet bundle against the folding plate while moving in the main scanning direction from the first position,
the folding-plate engagement member is separated from the folding plate until the folding-plate engagement member moves from another retracted position to a second position in the main scanning direction, and
the folding-plate engagement member presses the sheet bundle against the folding plate while moving in the main scanning direction from the second position.

7. The sheet processing apparatus according to claim 1, wherein the folding plate has first teeth having multiple protrusions and recesses on a pressing surface of the folding plate, the first teeth extending in a main scanning direction intersecting the first direction and the second direction,
the folding-plate engagement member has second teeth having multiple protrusions and recesses to engage with the first teeth, and
the controller:
moves the folding plate toward the folding-plate engagement member; and
causes the second teeth to engage with the first teeth with the sheet bundle interposed between the first teeth and the second teeth to perform the crimp-binding process on the back portion.

8. The sheet processing apparatus according to claim 1, wherein the folding-plate engagement member includes a blade facing the folding plate, and
the controller causes the blade to move toward the folding plate.

9. The sheet processing apparatus according to claim 1, wherein the back-crimp binder includes:
a first roller having teeth; and
a second roller to engage with the first roller via the sheet bundle, and
the controller moves the first roller and the second roller in a main scanning direction, intersecting the first direction and the second direction, of the sheet bundle.

10. An image forming system comprising:
an image forming apparatus to form an image on a sheet material; and the sheet processing apparatus according to claim 1, to perform a processing on the sheet material on which the image has been formed by the image forming apparatus.

11. A sheet processing method comprising:
performing a center-folding process, on a sheet bundle including multiple sheet materials, to form a fold portion in the sheet bundle,
wherein the center-folding process comprises:
guiding the sheet bundle with a folding plate in a first direction;
nipping the sheet bundle at a nip position;
advancing the sheet bundle in the first direction; and
pressurizing a folding-roller pair toward the nip position in a second direction intersecting the first direction;
forming a back portion on the sheet bundle subjected to the center-folding process; and
responsive to completion of the center-folding process, performing a crimp-binding process on the back portion while forming the back portion on the fold portion of the sheet bundle,
wherein the crimp-binding process comprises:
engaging a folding-plate engagement member with the folding plate via the sheet bundle, and
moving the folding-plate engagement member between: a retracted position at which the folding-plate engagement member is separated from the folding plate and an engagement position at which the sheet bundle is nipped between the folding plate and the folding-plate engagement member.

12. A sheet processing apparatus comprising:
a center-folder to perform a center-folding process on a sheet bundle including multiple sheet materials, wherein the center-folder includes:
a folding plate to guide a part of the sheet bundle in a first direction;
a folding-roller pair to:
nip the sheet bundle guided by the folding plate at a nip position; and
advance the sheet bundle in the first direction; and
a pressure mechanism to pressurize the folding-roller pair toward the nip position in a second direction intersecting the first direction;
a back-crimp binder to:
form a back portion on the sheet bundle subjected to the center-folding process; and
perform a crimp-binding process on the back portion; and
a controller configured to:
cause the center-folder to perform the center-folding process; and
responsive to completion of the center-folding process, cause the back-crimp binder to perform the crimp-binding process on the back portion while forming the back portion on the sheet bundle in the crimp-binding process,
wherein the back-crimp binder includes a folding-plate engagement member to engage with the folding plate via the sheet bundle,
the controller moves the folding-plate engagement member between: a retracted position at which the folding-plate engagement member is separated from the folding plate and an engagement position at which the sheet bundle is nipped between the folding plate and the folding-plate engagement member,
wherein the back-crimp binder includes:
a folding-plate-engagement heater including a heater to heat the sheet bundle and press the sheet bundle against the folding plate, and
the folding-plate-engagement heater heats an adhesive medium in an adhesive portion of the sheet bundle.

13. The sheet processing apparatus according to claim 12, wherein the adhesive medium includes a toner to form a visible image.

14. The sheet processing apparatus according to claim 12, wherein the folding-plate-engagement heater includes a roller rotatable about an axis extended in the second direction, and
the controller causes the roller to reciprocally moves in a main scanning direction intersecting the first direction and the second direction while causing the roller to press the sheet bundle against the folding plate in the first direction,
to form the back portion; and
to perform the crimp-binding process.

* * * * *